(12) United States Patent
Shoji et al.

(10) Patent No.: US 7,885,171 B2
(45) Date of Patent: Feb. 8, 2011

(54) INFORMATION RECORDING MEDIUM AND INFORMATION RECORDING APPARATUS

(75) Inventors: Mamoru Shoji, Osaka (JP); Kiyotaka Ito, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/536,627

(22) Filed: Aug. 6, 2009

(65) Prior Publication Data

US 2010/0039921 A1 Feb. 18, 2010

Related U.S. Application Data

(60) Provisional application No. 61/086,844, filed on Aug. 7, 2008.

(51) Int. Cl.
G11B 7/24 (2006.01)

(52) U.S. Cl. .................. 369/275.3; 369/47.53

(58) Field of Classification Search .............. 369/275.3, 369/275.1, 283, 47.53, 47.5, 53.1
See application file for complete search history.

(56) References Cited

U.S. PATENT DOCUMENTS

| 7,660,217 | B2 * | 2/2010 | Takeshita et al. ......... 369/47.53 |
| 2003/0063535 | A1 | 4/2003 | Shoji et al. |
| 2005/0226116 | A1 | 10/2005 | Kubo et al. |
| 2005/0276212 | A1 * | 12/2005 | Kato et al. .............. 369/275.1 |
| 2006/0140087 | A1 | 6/2006 | Kim et al. |
| 2006/0153035 | A1 | 7/2006 | Eguchi et al. |
| 2007/0159942 | A1 | 7/2007 | Takeshita et al. |

FOREIGN PATENT DOCUMENTS

| JP | 2002-358648 | 12/2002 |
| JP | 2005-063628 | 3/2005 |
| JP | 2005-529442 | 9/2005 |
| JP | 2006-252762 | 9/2006 |

(Continued)

OTHER PUBLICATIONS

International Search Report for corresponding Application No. PCT/JP2009/003782 dated Oct. 27, 2009.

(Continued)

*Primary Examiner*—Ali Neyzari
(74) *Attorney, Agent, or Firm*—Renner, Otto, Boisselle & Sklar, LLP

(57) ABSTRACT

An information storage medium according to the present invention has n information storage layers (where n is an integer and $n \geq 3$), on which data can be written with a laser beam and which are stacked one upon the other. Each of the n storage layers has a test write zone for determining the recording power of the laser beam. When those n layers are counted from the one that is located most distant from the surface of the medium on which the laser beam is incident, there is a bigger radial location difference between the outer peripheral end of the inner one of the test write zones of $i^{th}$ and $(i+1)^{th}$ information storage layers (where i is an integer that satisfies $2 \leq i \leq n-1$) and the inner peripheral end of the other outer test write zone than between the outer peripheral end of the inner one of the test write zones of $j^{th}$ and $(j+1)^{th}$ information storage layers (where j is an integer that satisfies $1 \leq j \leq i-1$) and the inner peripheral end of the other outer test write zone.

3 Claims, 14 Drawing Sheets

FOREIGN PATENT DOCUMENTS

JP          2007-164954        6/2007

OTHER PUBLICATIONS

Form PCT/ISA/237 and partial English translation.

Blu-ray Disc Reader (Blu-ray Handbook), published by Ohmsha, Ltd., pp. 13-28 (cited in the specification) with a concise explanation.

White paper, Blu-ray Disc Format, General, Aug. 2004, pp. 1-37 (cited in the specification).

White paper, Blu-ray Disc Format, 3. File System Specifications for BD-RE, R, ROM, Aug. 2004, pp. 1-6 (cited in the specification).

White paper, Blu-ray Disc Format, 4. Key Technologies, Aug. 2004, pp. 1-8 (cited in the specification).

Blu-ray Disc Reader, published by Ohmsha, Ltd., Dec. 2006, pp. 161-162 (cited on p. 85, line6 of the specification) with a partial English translation.

\* cited by examiner

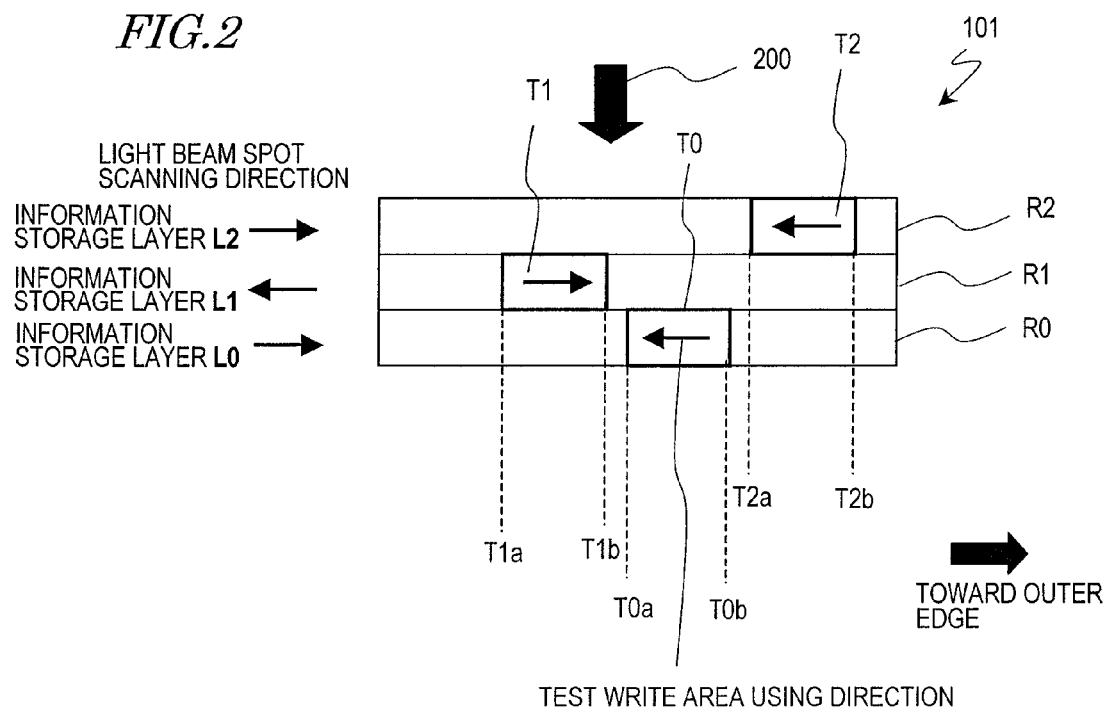

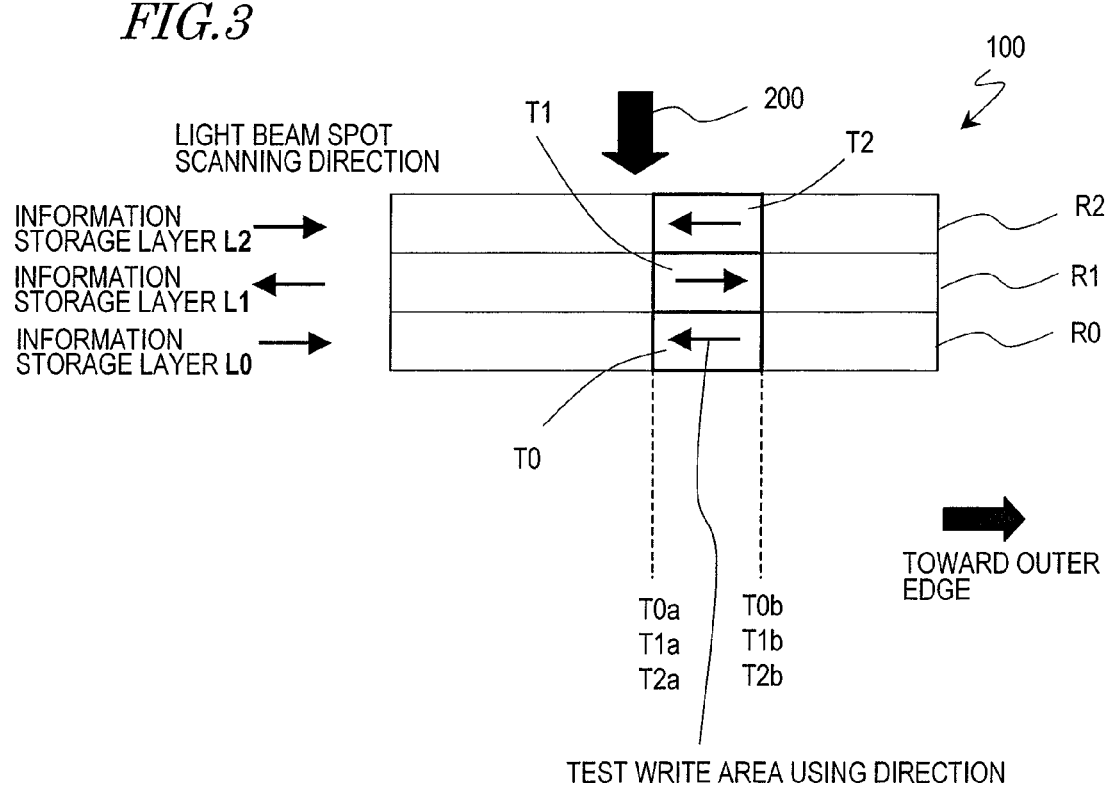

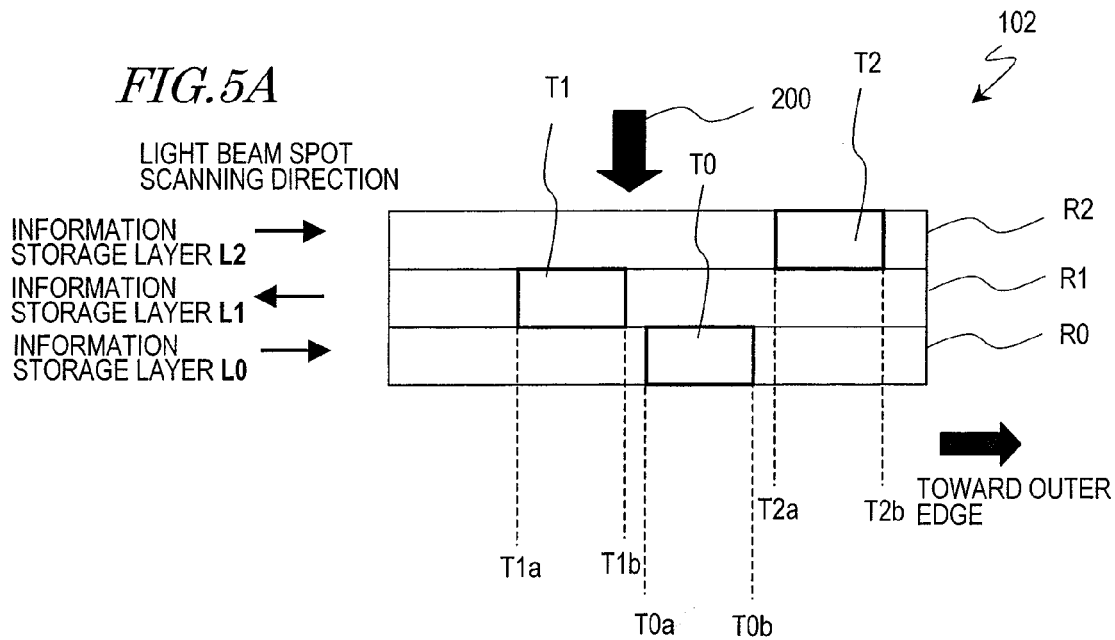
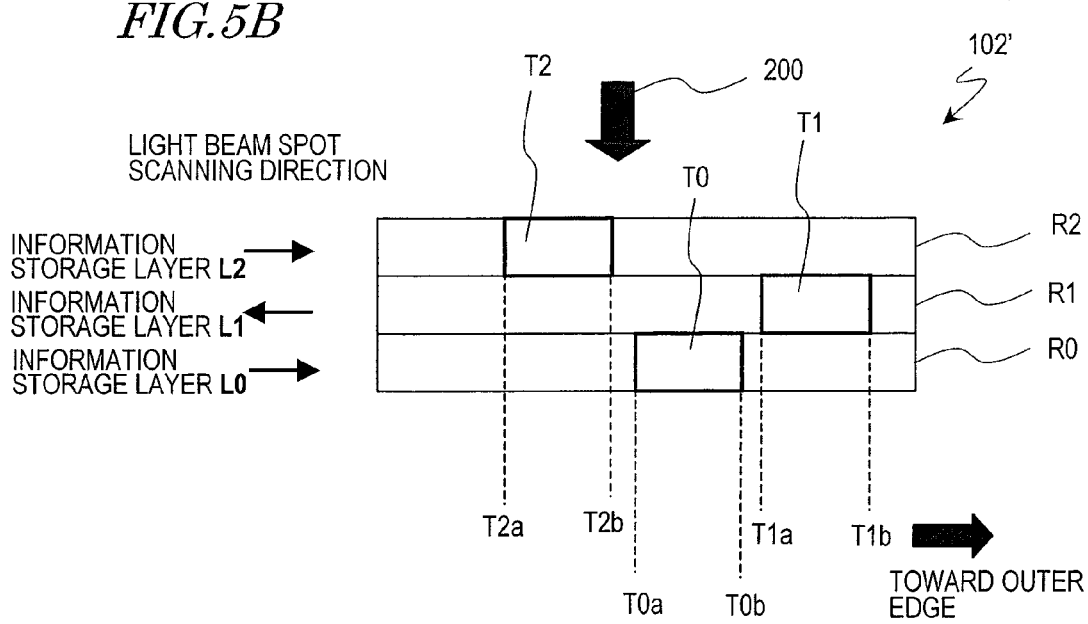

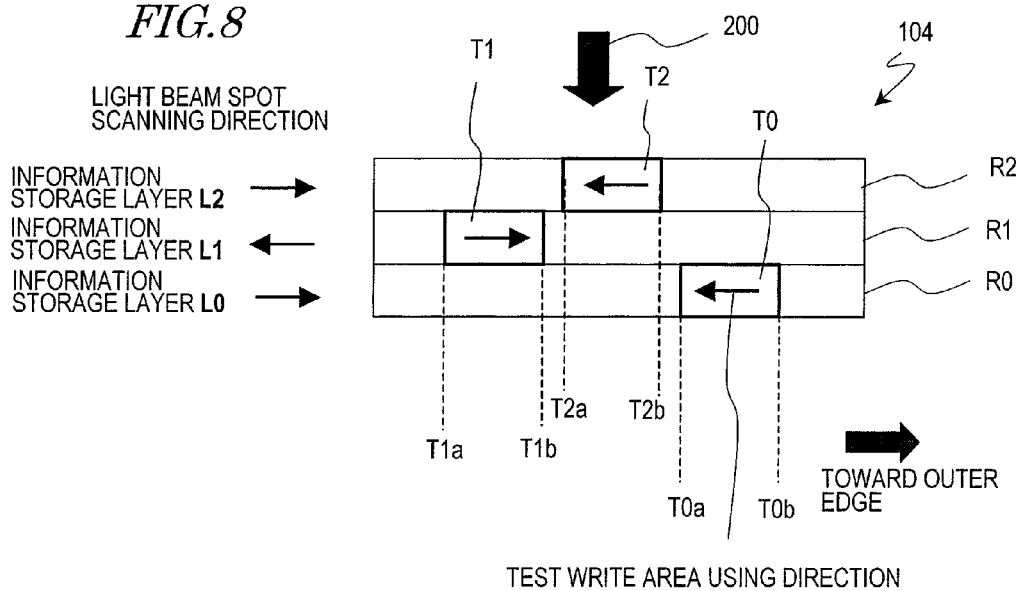
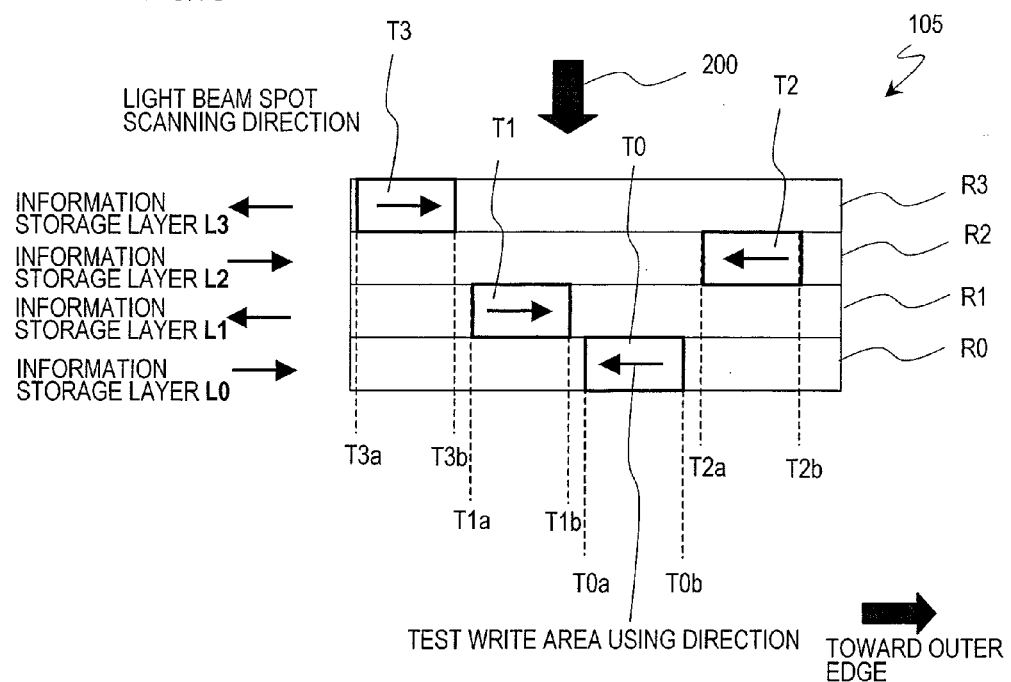

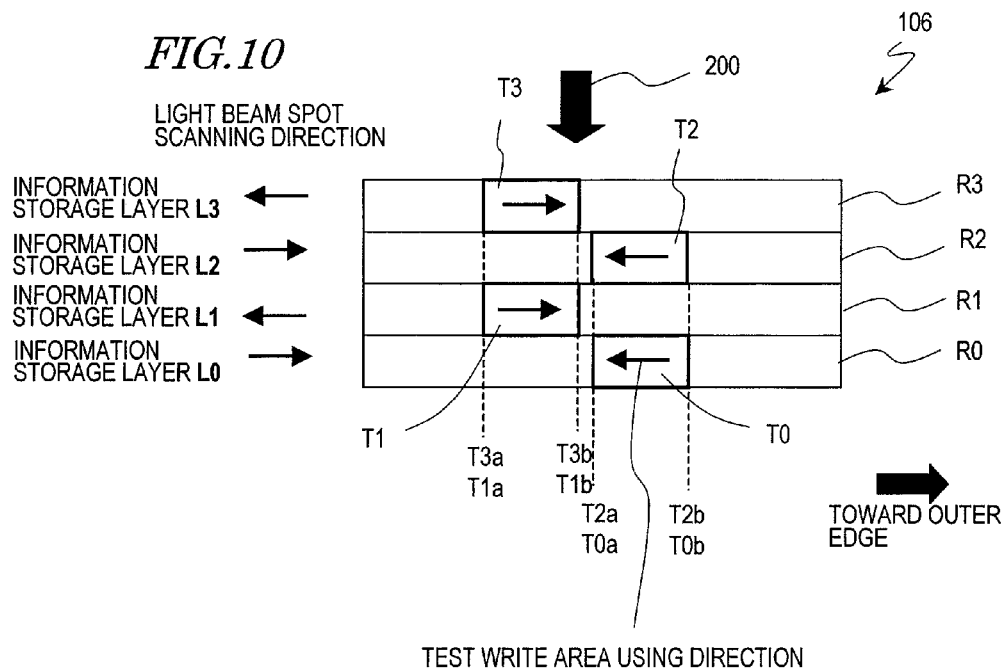
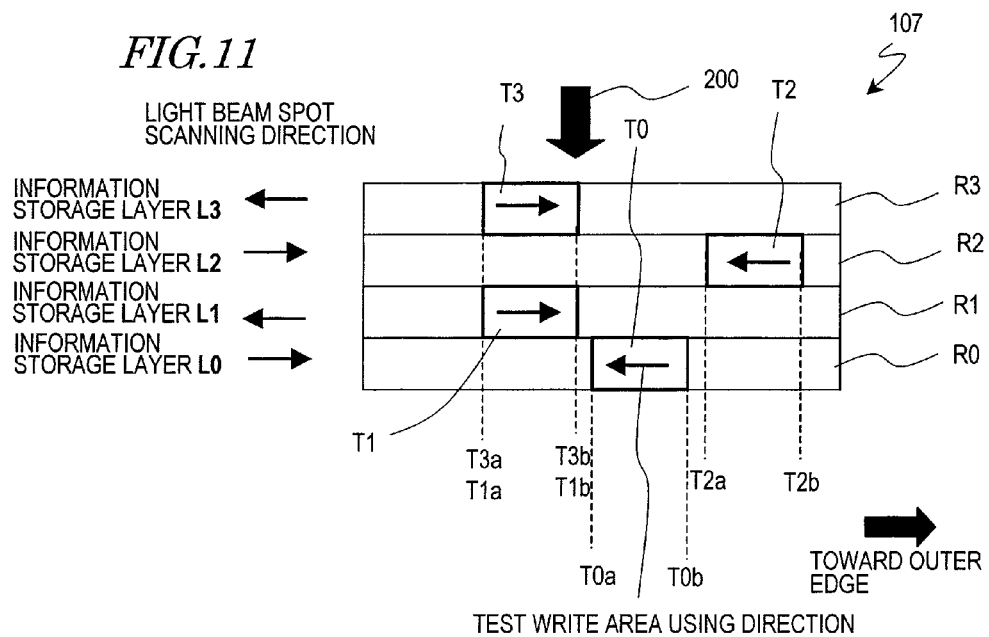

INFORMATION RECORDING MEDIUM AND INFORMATION RECORDING APPARATUS

BACKGROUND OF THE INVENTION

1. Field of the Invention

The present invention relates to an information storage medium on which information is written by being irradiated with a laser beam. More particularly, the present invention relates to an information storage medium with three or more information storage layers and an information writing device that is compatible with such an information storage medium.

2. Description of the Related Art

Various types of information storage media, on which information can be written by being irradiating with light that has been modulated so as to represent the information to write (such as a laser beam), have been developed extensively as means for storing a huge amount of information thereon. Examples of those information storage media include a write-once information storage medium, on which information can be written only once on each particular area, and a rewritable information storage medium, on which information can be rewritten an unlimited number of times. Those two types are generally called a "write-once optical disc" and a "rewritable optical disc", respectively.

To increase the storage capacity of an optical disc by leaps and bounds, it is an effective measure to take to get multiple storage layers stacked one upon the other in a single optical disc. As for DVDs and BDs, dual-layer discs with two information storage layers are already available.

Such an optical disc has a test write zone for determining appropriate writing conditions for writing information (such as the recording power of the light, among other things) in each of its information storage layers. In writing information on an optical disc using an optical disc drive, the recording power is optimized using the test write zone when the drive is being loaded with the disc or just before data is actually written on it. For example, Japanese Patent Application Laid-Open Publication No. 2002-358648 discloses a method for determining the recording power for a write-once optical disc.

Japanese Patent Application Laid-Open Publication No. 2002-358648 does disclose techniques applicable to an optical disc with two information storage layers but discloses nothing about the structure of an optical disc with three or more information storage layers (e.g., the arrangement of test write zones and how to use them, among other things).

SUMMARY OF THE INVENTION

It is therefore an object of the present invention to provide an information storage medium with three or more information storage layers, on each of which information can be written under appropriate conditions, and also provide an information storage device that is compatible with such an information storage medium.

An information storage medium according to the present invention has n information storage layers (where n is an integer that is equal to or greater than three), on which data can be written with a laser beam and which are stacked one upon the other. Each of the n information storage layers has a test write zone for determining the recording power of the laser beam. When those n information storage layers are counted from the one that is located most distant from the surface of the medium on which the laser beam is incident, there is a bigger radial location difference between the outer peripheral end of the inner one of the test write zones of $i^{th}$ and $(i+1)^{th}$ information storage layers (where i is an integer that satisfies $2 \leq i \leq n-1$) and the inner peripheral end of the other outer test write zone than between the outer peripheral end of the inner one of the test write zones of $j^{th}$ and $(j+1)^{th}$ information storage layers (where j is an integer that satisfies $1 \leq j \leq i-1$) and the inner peripheral end of the other outer test write zone.

Another information storage medium according to the present invention has at least three information storage layers. And there is a wider radial gap between the respective test write zones of a pair of adjacent information storage layers that are located closer to the surface of the medium on which a laser beam is incident than between the respective test write zones of another pair of adjacent information storage layers that are located more distant from that surface.

Still another information storage medium according to the present invention has n information storage layers (where n is an integer that is equal to or greater than three), on which data can be written with a laser beam and which are stacked one upon the other. Each of the n information storage layers has a test write zone for determining the recording power of the laser beam. When those n information storage layers are counted from the one that is located most distant from the surface of the medium on which the laser beam is incident, there is a bigger radial location difference between the inner peripheral end of the inner one of the test write zones of $k^{th}$ and $(k+1)^{th}$ information storage layers (where k is an integer that satisfies $1 \leq k \leq n-2$) and the outer peripheral end of the other outer test write zone than between the inner peripheral end of the inner one of the test write zones of $k^{th}$ and $(k+2)^{th}$ information storage layers and the outer peripheral end of the other outer test write zone.

In one preferred embodiment, n is four and k is one.

Still another information storage medium according to the present invention has n information storage layers (where n is an integer that is equal to or greater than four), on which data can be written with a laser beam and which are stacked one upon the other. Each of the n information storage layers has a test write zone for determining the recording power of the laser beam. When those n information storage layers are counted from the one that is located most distant from the surface of the medium on which the laser beam is incident, there is a bigger radial location difference between the inner peripheral end of the inner one of the test write zones of $k'^{th}$ and $(k'+1)^{th}$ information storage layers (where k' is an integer that satisfies $1 \leq k' \leq n-3$) and the outer peripheral end of the other outer test write zone than between the inner peripheral end of the inner one of the test write zones of $(k'+1)^{th}$ and $(k'+3)^{th}$ information storage layers and the outer peripheral end of the other outer test write zone.

Yet another information storage medium according to the present invention has n information storage layers (where n is an integer that is equal to or greater than three), on which data can be written with a laser beam and which are stacked one upon the other. Each of the n information storage layers has a test write zone for determining the recording power of the laser beam. When those n information storage layers are counted from the one that is located most distant from the surface of the medium on which the laser beam is incident, the test write zone of the third most distant information storage layer is located closer to the outer edge of the medium than that of the most distant information storage layer, which is located closer to that outer edge than the test write zone of the second most distant information storage layer is.

In one preferred embodiment, n is four.

Yet another information storage medium according to the present invention has n information storage layers (where n is an integer that is equal to or greater than four), on which data can be written with a laser beam and which are stacked one upon the other. Each of the n information storage layers has a test write zone for determining the recording power of the laser beam. When those n information storage layers are counted from the one that is located most distant from the surface of the medium on which the laser beam is incident, the test write zone of the third most distant information storage layer is located closer to the outer edge of the medium than that of the second most distant information storage layer, which is located closer to that outer edge than the test write zone of the fourth most distant information storage layer is.

Yet another information storage medium according to the present invention has n information storage layers (where n is an integer that is equal to or greater than four), on which data can be written with a laser beam and which are stacked one upon the other. Each of the n information storage layers has a test write zone for determining the recording power of the laser beam. When those n information storage layers are counted from the one that is located most distant from the surface of the medium on which the laser beam is incident, the test write zone of the third most distant information storage layer is located closer to the outer edge of the medium than that of the most distant information storage layer, which is located closer to that outer edge than the test write zone of the fourth most distant information storage layer is.

Yet another information storage medium according to the present invention has n information storage layers (where n is an integer that is equal to or greater than three), on which data can be written with a laser beam and which are stacked one upon the other. Each of the n information storage layers has a test write zone for determining the recording power of the laser beam. The test write zones are arranged at mutually different radial locations and each test write zone has a plurality of sub-areas. When those n information storage layers are counted from the one that is located most distant from the surface of the medium on which the laser beam is incident, an $i^{th}$ information storage layer (where i is an even number that satisfies $2 \leq i \leq n$) is scanned with the laser beam toward the inner edge of the medium but the sub-areas of its test write zone are used toward the outer edge of the medium. On the other hand, an $(i-1)^{th}$ information storage layer is scanned with the laser beam toward the outer edge of the medium but the sub-areas of its test write zone are used toward the inner edge of the medium.

An information reading device according to the present invention performs a read operation on an information storage medium according to any of the preferred embodiments of the present invention described above. The information storage medium has a control area in at least one of the n information storage layers thereof. The device performs at least one of the steps of: retrieving information about the information storage medium from the control area; and reading data that has been written on any of the n information storage layers with recording power that has been regulated with the test write zone of that layer.

An information writing device according to the present invention performs a write operation on an information storage medium according to any of the preferred embodiments of the present invention described above. The device determines the recording power of the laser beam using the test write zone of one of the n information storage layers, and writes data on that layer by irradiating the medium with the laser beam that has had its recording power determined.

A reading method according to the present invention is designed to perform a read operation on an information storage medium according to any of the preferred embodiments of the present invention described above. The information storage medium has a control area in at least one of the n information storage layers thereof. The method includes at least one of the steps of: retrieving information about the information storage medium from the control area; and reading data that has been written on any of the n information storage layers with recording power that has been regulated with the test write zone of that layer.

A writing method according to the present invention is designed to write data on an information storage medium according to any of the preferred embodiments of the present invention described above. The method comprises the steps of: determining the recording power of the laser beam using the test write zone of one of the n information storage layers; and writing data on that layer by irradiating the medium with the laser beam that has had its recording power determined.

An optical disc according to the present invention has three or more information storage layers, each of which has a test write zone. That is why even if those information storage layers are irradiated with a laser beam at mutually different intensities or in respectively different thermal environments, a test write operation can still be performed on the target information storage layer, on which a write operation is going to be performed, using its test write zone under the operating environment of that layer. Consequently, the best recording power can be determined for each of those information storage layers.

BRIEF DESCRIPTION OF THE DRAWINGS

FIG. 2 is a schematic representation illustrating an arrangement of test write zones for the information storage medium shown in FIG. 1.

FIG. 3 is a schematic representation illustrating the arrangement of test write zones in an information storage medium as comparative example.

FIG. 5A is a schematic representation illustrating an alternative arrangement of test write zones for the information storage medium of the first preferred embodiment.

FIG. 5B is a schematic representation illustrating another alternative arrangement of test write zones for the information storage medium of the first preferred embodiment.

FIG. 8 is a schematic representation illustrating another alternative arrangement of test write zones for the information storage medium of the first preferred embodiment.

FIG. 9 is a schematic representation illustrating an arrangement of test write zones for an information storage medium as a second preferred embodiment of the present invention.

FIG. 10 is a schematic representation illustrating an alternative arrangement of test write zones for the information storage medium of the second preferred embodiment.

FIG. 11 is a schematic representation illustrating another alternative arrangement of test write zones for the information storage medium of the second preferred embodiment.

DETAILED DESCRIPTION OF PREFERRED EMBODIMENTS

Embodiment 1

Hereinafter, a first preferred embodiment of an information storage medium according to the present invention will be described with reference to the accompanying drawings. An information storage medium according to the present invention may be either a write-once one or a rewritable one.

Figure 1:
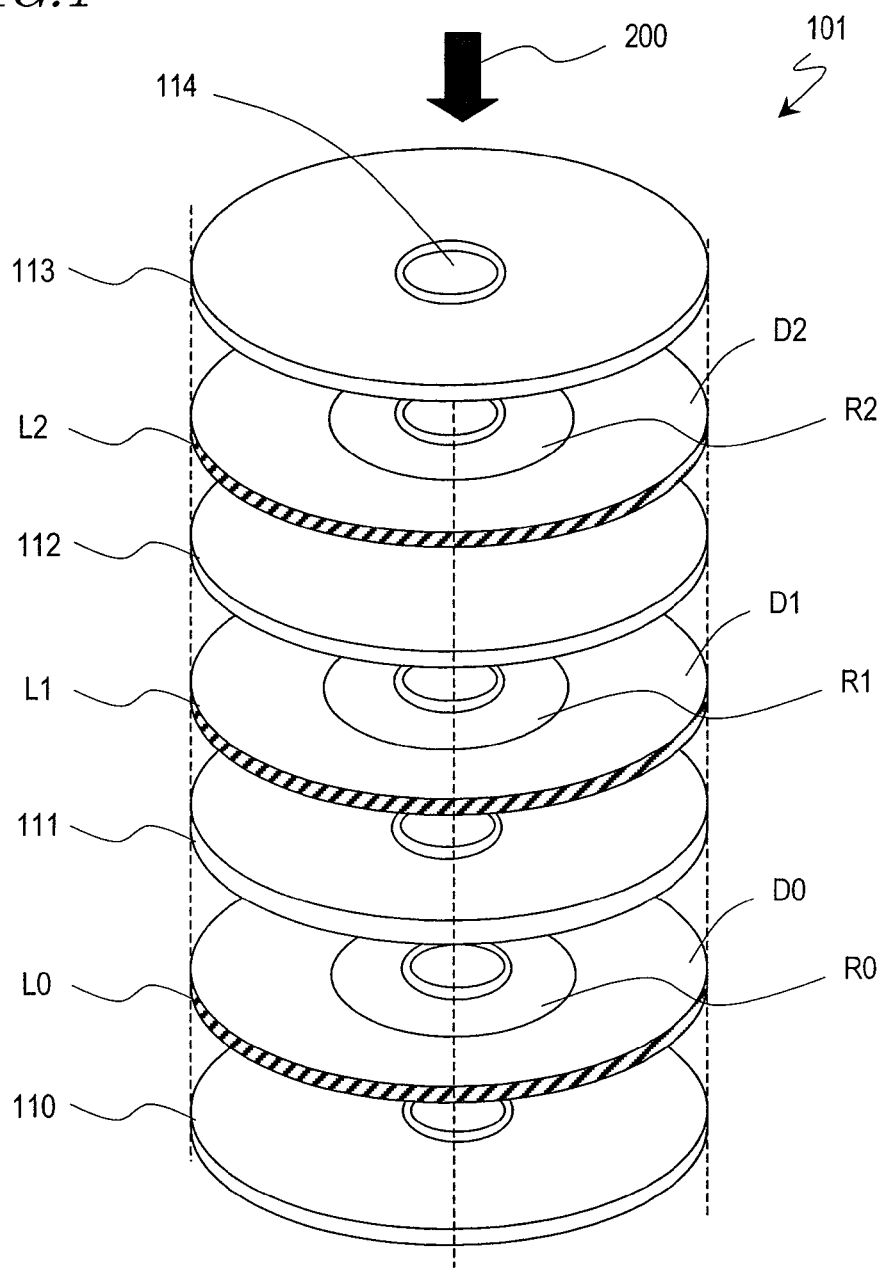
FIG. 1 is a schematic exploded perspective view illustrating the makeup of an information storage medium as a first specific preferred embodiment of the present invention.

FIG. 1 is a schematic exploded perspective view illustrating the makeup of an information storage medium as a first specific preferred embodiment of the present invention. As mentioned above, an information storage medium from/on which information can be read and/or written optically is generally called an "optical disc". Thus, the information storage medium of the present invention will also be referred to herein as an "optical disc". As used herein, "information" refers to character information, audio information, image or video information, programs, and various other kinds of information that can be stored on an information storage medium. Any of these pieces of information is digitized and then written on an information storage medium or processed by any of various types of information processors. In general, that type of "information" to be processed by a computer is called "data". That is why "information" is synonymous herein with "data". In this description, one of these terms "information" and "data" will be selectively used according to general or conventional usage. For example, an optical disc will be referred to herein as an "information storage medium" but the area to store information a "data area" according to general usage.

As shown in FIG. 1, the optical disc 101 includes a substrate 110, information storage layers L0, L1 and L2, spacer layers 111 and 112, and a cover layer 113. The information storage layers L0, L1 and L2 are arranged between the substrate 110 and the cover layer 113 so that the information storage layer L0 is located closer to the substrate 110 and the information storage layer L2 is located closer to the cover layer 113. As a laser beam 200 that has been modulated so as to represent the information to write irradiates the disc through the cover layer 113, the information storage layers L0, L1 and L2 are stacked in this order so that the information storage layer L0 is located most distant from the surface of the cover layer 113 on which the laser beam 200 is incident. The spacer layers 111 and 112 are arranged between the information storage layers L0 and L1 and between the information storage layers L1 and L2, respectively.

The substrate 110, the information storage layers L0, L1 and L2, the spacer layers 111 and 112 and the cover layer 113 are stacked one upon the other in the order described above and bonded together. And a clamp hole 114 has been cut through the center of the optical disc 101 with such a multi-layer structure. The substrate 110, the spacer layers 111 and 112 and the cover layer 113 may be made of a polycarbonate resin, for example.

On each of the information storage layers L0, L1 and L2, arranged are concentric or spiral tracks on which data is written. Also, each of these information storage layers L0, L1 and L2 has a data area D0, D1 or D2 and a lead-in area R0, R1 or R2, which is arranged closer to the inner edge of the disc than the data area D0, D1 or D2 is.

The data areas D0, D1 and D2 are areas on which user data will be written. If the optical disc 101 is a write-once disc, information may be written only once on each portion of the data areas D0, D1 and D2 and can never be rewritten. If the optical disc 101 is a rewritable one, however, the information that has once been written on the data area D0, D1 or D2 can be rewritten with any other piece of information after that.

Each of the lead-in areas R0, R1 and R2 has at least a read-only control area (which is also called a PIC (permanent information and control data) area) and a test write zone (which is also called an OPC (optimum power control) area) on which information can be written.

The test write zone is used to regulate the recording power of the laser beam in writing information on the data area. Specifically, the test write zone is irradiated with a laser beam, which has been modulated so as to represent predetermined information, while varying its recording power, thereby making recording marks there. After that, those recording marks left are irradiated with a laser beam to read the information stored there and the quality of the information read is rated, thereby determining the best recording power.

The test write zone of the lead-in area R0 is used to regulate the recording power of the laser beam for writing information on the data area D0 of the same information storage layer L0. In the same way, the test write zones of the lead-in areas R1 and R2 are used to regulate the recording power of the laser beam for writing information on the data areas D1 and D2, respectively.

In the control area, stored are disc information and information about various recording parameters such as the power of the irradiating laser beam for writing user data as recommended by the manufacturer of the storage medium (optical disc). The best recording parameters for writing information on the information storage layers L0, L1 and L2 change from one layer to another. In this preferred embodiment, the control area of each of the lead-in areas R0, R1 and R2 is supposed to store not only information about the recording parameters for writing information on the data area of its own information storage layer but also information about the recording parameters for writing information on the other information storage layers. Specifically, in the control area of the lead-in area R0, stored is information about the recording parameters for writing information on the data areas D0, D1 and D2 of all of the three information storage layers L0, L1 and L2. Likewise, the control area of each of the other lead-in areas R1 and R2 also stores information about the recording parameters for writing information on the data areas D0, D1 and D2 of all three information storage layers L0, L1 and L2.

Thus, information about the recording parameters for all three information storage layers can be obtained from the control area of any one of the three information storage layers. That is why compared to a situation where the control area of each information storage layer stores only information about the recording parameters for that information storage layer, user data can start being written in a shorter time. Also, even if a different information storage layer from the target one has started being scanned by mistake due to a disturbance, for example, information about the recording parameters for the target information storage layer can also be obtained by scanning the control area of that wrong information storage layer.

The recording parameters do not always have to be stored in the control area as described above. Alternatively, the control area of each information storage layer may store information about only the recording parameters for performing a write operation on the data area of that layer. In that case, the amount of the recording parameter information to be stored in each control area can be cut down, and therefore, the size of the control area can also be reduced. As a result, even if there are an increased number of information storage layers and if the test write zones of those storage layers are arranged at mutually different radial locations as will be described later, the control areas can still be secured more easily.

Also, if the optical disc 101 is a write-once type, the control area of just one of the multiple information storage layers thereof may store information about the recording parameters for writing information on the data area of every information storage layer included in that optical disc 101. In that case, the control area that stores the recording parameter information about all information storage layers may be arranged on the information storage layer that is located most distant from the light incident surface.

If the optical disc 101 is a write-once disc, information about the recording parameters for writing information on the data areas D0, D1 and D2 of the information storage layers L0, L1 and L2 may be stored in only the control area of the lead-in area R0 on the information storage layer L0, for example.

Furthermore, in that case, the depth (or the thickness) of the information storage layer L0 as measured from the surface of the cover layer 113 on which the laser beam 200 is incident (i.e., the surface of the disc 101) may agree with the depth of the only information storage layer of a single-layer optical disc as measured from the disc surface. Then, an optical disc drive for performing a read/write operation on an optical disc with a single information storage layer can also obtain the disc information of any of the information storage layers L0, L1 and L2 of the optical disc 101. That is to say, an optical disc drive with a simpler configuration may be used in that case.

Generally speaking, the more distant from the optical disc surface an information storage layer is, the more significantly the signal read from that layer will deteriorate due to a tilt. That is why if a given optical disc has multiple information storage layers, the depth of one of those information storage layers (i.e., the reference layer) that is located at the deepest level from the surface (i.e., closest to the substrate) is preferably approximately equal to that of the only information storage layer of a single-layer optical disc. In that case, if the area of each of the other information storage layers, corresponding to the disc information area of that information storage layer closest to the substrate, has the same groove structure as the data area, then the transmittance of the laser beam to that information storage layer closest to the substrate can be the same anywhere on the disc irrespective of the radial location. Thus, the optical disc drive can have its configuration simplified, and other layers can be made more easily, because there is no need to provide any special detecting means for retrieving the disc information from that information storage layer that is located closest to the substrate.

FIG. 2 is a schematic cross-sectional view of the optical disc 101 and illustrates the arrangement of test write zones in the lead-in areas R0, R1 and R2. In FIG. 2 and other similar drawings, the spacer layers 111 and 112 are not shown. The laser beam 200 is supposed to come from the structure shown in FIG. 2 and the outer edge of the disc is located on the right-hand side as indicated by the arrow shown in FIG. 2.

As shown in FIG. 2, test write zones T0, T1 and T2 are located in the lead-in areas R0, R1 and R2 of the information storage layers L0, L1 and L2, respectively. These test write zones T0, T1 and T2 are arranged at mutually different radial locations so as not to overlap with each other at all in the direction in which these information storage layers L0, L1 and L2 are stacked one upon the other (i.e., as viewed in the direction in which the laser beam 200 comes).

More specifically, in the optical disc 101, the inner peripheral end T0a of the test write zone T0 of the second innermost information storage layer L0 is located closer to the outer edge of the disc than the outer peripheral end T1b of the test write zone T1 of the innermost information storage layer L1, and a gap (or an interval) is left between them so that the test write zones do not overlap with each other. This gap has a distance that is defined by the difference between the respective radial locations of the inner peripheral end T0a and the outer peripheral end T1b. Likewise, the inner peripheral end T2a of the test write zone T2 of the outermost information storage layer L2 is located closer to the outer edge of the disc than the outer peripheral end T0b of the test write zone T0 of the second innermost information storage layer L0, and a gap that is defined by the difference between the respective radial locations of the inner peripheral end T2a and the outer peripheral end T0b is left between them.

If the three information storage layers L0, L1 and L2 are counted from the one that is located most distant from the surface on which the laser beam 200 is incident, the test write zone T2 of the third most distant information storage layer L2 is located closer to the outer edge of the disc than the test write zone T0 of the most distant information storage layer L0 is. And the test write zone T0 of the information storage layer L0 is located closer to that outer edge than the test write zone T1 of the second most distant information storage layer L1 is.

Next, it will be described what effect will be achieved by such an arrangement of the test write zones T0, T1 and T2. Suppose the test write zones T0, T1 and T2 are arranged at the same radial location as shown in FIG. 3 on the information storage layers L0, L1 and L2 unlike this preferred embodiment. That is to say, suppose the radial locations of the respective inner peripheral ends T0a, T1a and T2a of the test write zones T0, T1 and T2 agree with each other, so do those of their outer peripheral ends T0b, T1b and T2b, and therefore, the test write zones T0, T1 and T2 entirely overlap with each other. In that case, if the test write zone T1 of the information storage layer L1 were destroyed, then the transmittance of the laser beam through the test write zone T1 would decrease so significantly that the laser beam could not reach the test write zone T0 of the information storage layer L0, which is located more distant for the laser beam than the information storage layer L1. As a result, the optical disc drive could not access the test write zone T0 of the information storage layer L0 while attempting to perform a test write operation on it.

Also, even if the test write zone T1 of the information storage layer L1 were not destroyed but had its transmittance varied significantly as a result of a test write operation that has been performed with too much irradiation power on the test write zone T1 on the information storage layer L1, then the intensity of the laser beam reaching the information storage layer L0 would change depending on whether a write operation is performed on the test write zone T1 or not.

Likewise, if the test write zone T2 were destroyed or if the transmittance of the laser beam through the test write zone T2 had changed significantly, then the other test write zones T0 and T1 could be affected. For that reason, according to the arrangement of the test write zones shown in FIG. 3, the test write operation could not be performed properly on the test write zones T0 and T1 of the information storage layers L0 and L1 and the recording power could not be determined properly for the information storage layers L0 and L1, either.

On the other hand, according to the arrangement of the test write zones of this preferred embodiment shown in FIG. 2, the test write zones T0, T1 and T2 are arranged at mutually different radial locations, and do not overlap with each other at all in the direction in which the information storage layers are stacked one upon the other. That is why even if the test write zone T1 of the information storage layer L1 were destroyed, the laser beam could still reach the test write zone T0 of the information storage layer L0 without (or at least almost without) being affected by the test write zone T1 destroyed. Consequently, the test write operation could be performed just as intended on the test write zone T0 of the information storage layer L0 and the recording power could still be determined properly for the information storage layer L0. Likewise, even if the test write zone T2 of the information storage layer L2 were destroyed, the recording powers could still be determined properly for the information storage layers L0 and L1.

Also, for the same reason, even if the transmittance of the laser beam passing through any of the test write zones T0, T1 and T2 varied, the laser beam could still reach the test write zone T0, T1, T2 of each information storage layer L0, L1, L2. Consequently, the test write operation could be performed just as intended on the test write zone T0, T1, T2 of each information storage layer L0, L1, L2 and the recording power could still be determined properly for every information storage layer L0, L1, L2.

In a rewritable optical disc that utilizes a phase change of an information storage layer, even if amorphous and crystalline recording marks have mutually different transmittances, the transmittance of the information storage layer can still be kept unchanged by erasing the recording marks after the recording power has been determined. In a write-once optical disc, on which a write operation can be performed only once, the recording film of its information storage layer has irreversible properties. That is why the arrangement of the test write zones according to this preferred embodiment can be used particularly effectively in a write-once optical disc, among other things.

Next, it will be described in which directions the test write zones T0, T1 and T2 are used. As indicated by the arrows in FIG. 2, the tracks are arranged on the information storage layers L0 and L2 so that the laser beam scans the information storage layers L0 and L2 outward (i.e., from some inner radial location on the disc toward the outer edge thereof). On the information storage layer L1, on the other hand, the tracks are arranged so that the laser beam scans the information storage layer L1 inward (i.e., from some outer radial location on the disc toward the inner edge thereof). For example, if the tracks are arranged spirally, the direction in which those tracks are arranged spirally on the information storage layers L0 and L2 is opposite to the one in which the tracks are arranged spirally on the information storage layer L1. That is why in reading or writing information from/on the information storage layers L0 and L1 continuously, as soon as the last session of a read/write operation on the information storage layer L0 is done on the outermost portion of the data area D0, the first session of a read/write operation on the information storage layer L1 can be started from the outermost portion of the data area D1 with the laser beam spot fixed at the same radial location. Likewise, as soon as the last session of a read/write operation on the information storage layer L1 is done on the innermost portion of the data area D1, the first session of a read/write operation on the information storage layer L2 can be started from the innermost portion of the data area D2 with the laser beam spot fixed at the same radial location. Thus, information can be read or written without making the laser beam spot jump all the way toward the innermost or outermost location on the optical disc 101 every time the target layers need to be changed into the next information storage layer. Nevertheless, if the requirements to be described later are satisfied, the laser beam spot does not always have to go in such directions on the respective layers.

Meanwhile, the test write zones T0, T1 and T2 are preferably used in opposite directions to the ones in which the laser beam spot goes on the respective information storage layers. Hereinafter, it will be described exactly in which directions the test write zones are used.

As described above, the test write zone arranged in each of these information storage layers is provided to determine the irradiation power of a laser beam for writing data on the data area of that layer by performing a test write operation on that area. For example, test data may be written on the test write zone a number of times with the irradiation power increased by 1 mW each time, and then the test data written may be read to determine what irradiate power should be adopted to obtain the best read signal indices such as error rate and jitter.

In writing test data, the irradiation power may be set, by reference to the control area, close to a recommended irradiation power that is stored in the control area. However, if the actual irradiation power would be slightly different from the power setting due to a variation in the sensitivity of the given optical disc to the laser beam or in the performance of the optical head of an optical disc drive that performs a write operation on the optical disc, then such an expected deviation could be taken into account. For example, the test data may be written with the irradiation power varied at a step of 5% within a power range that covers ±20% around the recommended power.

Also, instead of adopting the irradiation power that optimizes the read signal indices, a reference value may be set with respect to the error rate or jitter, and the recording power for writing user data may be defined to be a power value that is located approximately at the center of an irradiation power range that is equal to or lower than the reference value. In that case, even if the actual irradiation power deviated significantly from the power setting due to a variation in the temperature of the light source that emits the laser beam while user data is being written, the user data could still be written with quality as long as the irradiation power falls within a range in which the variation is equal to or smaller than a reference value. Furthermore, even if the optical disc were somewhat warped, the user data could still be written accurately as long as the irradiation power falls within a range in which the variation in recording power is equal to or smaller than a reference value.

Nevertheless, according to such a technique for determining the recording power, the irradiation power should be varied significantly in the test write zone. That is why the test write zone on which data has been written with high power could possibly deteriorate.

On a rewritable optical disc, a test write operation can be performed on the same area a number of times unless the test write zone deteriorates as a result of the test write operation. That is why there is no need to pose any restriction on how to use the test write zone. As for a write-once optical disc on which data can be written only once, however, the unrecorded test write zones thereof are preferably used sequentially from either end, rather than at random, because test data needs to be written with the irradiation power varied when the recording power should be determined as described above. Also, even in a rewritable optical disc, if the write performance varied as the write operation is repeatedly performed thereon an increasing number of times, the test write zones thereof are also preferably used sequentially from either end, just like a write-once optical disc.

Figure 4A:
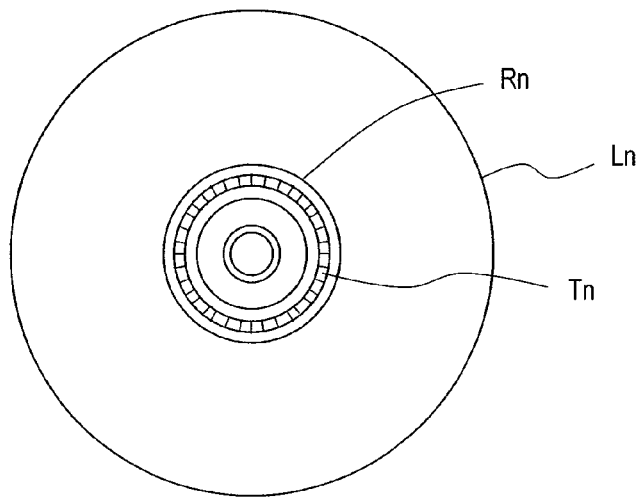
FIG. 4A schematically illustrates the structure of each of the information storage layers of the information storage medium shown in FIG. 1.
Figure 4B:
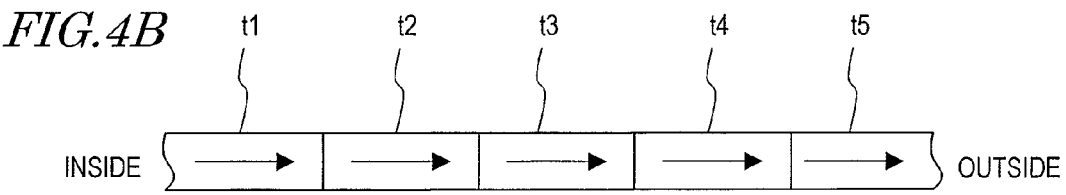
FIG. 4B is a schematic representation illustrating a direction in which the test write zone may be used on each of the information storage layers of the information storage medium shown in FIG. 1.
Figure 4C:
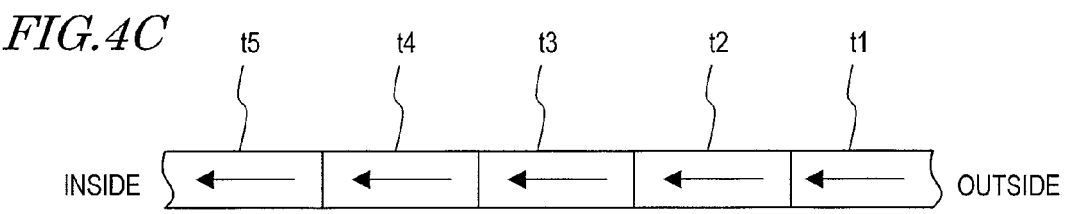
FIG. 4C is a schematic representation illustrating another direction in which the test write zone may be used on each of the information storage layers of the information storage medium shown in FIG. 1.

FIG. 4A illustrates an arbitrary one Ln (where n is 0, 1 or 2) of the information storage layers L0, L1 and L2 of the optical disc 101. As described above, the information storage layer Ln has a lead-in area Rn, in which there is a test write zone Tn. Each of the test write zones T0, T1 and T2 is given addresses and is made up of sub-areas called "clusters", which have a predetermined number of consecutive addresses. FIGS. 4B and 4C schematically illustrate the sub-areas t1, t2, t3, t4, t5 and so on of the test write zone Tn. For example, one of these sub-areas may be used every time a test write operation is done as described above. The test write zone T0, T1, T2 of each of the three information storage layers L0, L1 and L2 consists of the same number of sub-areas (or clusters) as the test write zone T0, T1, T2 of any other information storage layer L0, L1, L2. That is to say, the test write zones T0, T1 and T2 have the same size.

As shown in FIG. 2, the laser beam scans the information storage layer L0 outward (i.e., from some inner radial location toward the outer edge of the disc). That is why the test write zone T0 thereof has sub-areas t1, t2, t3, t4, t5 and so on, to which addresses are assigned in the scanning direction of the laser beam as indicated by the arrows in FIG. 4B. In that case, those sub-areas t1, t2, t3, t4, t5 and so on are sequentially used inward. That is to say, the outermost one of the unrecorded sub-areas t1, t2, t3, t4, t5 and so on is used first, the second outermost one next, and so forth. In the example illustrated in FIG. 4B, the sub-areas are used in the order of t5, t4, t3, t2 and t1. Nevertheless, in each of those sub-areas, a test write operation is still performed in the laser beam scanning direction indicated by the arrows. Likewise, the laser beam also scans the information storage layer L2 outward, and therefore, its sub-areas t1, t2, t3, t4, t5 and so on are used inward in the order of t5, t4, t3, t2 and t1.

On the other hand, the laser beam scans the information storage layer L1 inward (i.e., from some outer radial location toward the inner edge of the disc). That is why the test write zone T1 thereof has sub-areas t1, t2, t3, t4, t5 and so on, to which addresses are assigned in the scanning direction of the laser beam as indicated by the arrows in FIG. 4C. In that case, those sub-areas t1, t2, t3, t4, t5 and so on are sequentially used outward. That is to say, the innermost one of the unrecorded sub-areas t1, t2, t3, t4, t5 and so on is used first, the second innermost one next, and so forth. In the example illustrated in FIG. 4C, the sub-areas are used in the order of t5, t4, t3, t2 and t1.

In this manner, the sub-areas of each test write zone are used in the opposite direction to the laser beam scanning direction (i.e., the direction in which the light beam spot goes). Thus, even if any sub-area of the test write zone were destroyed with too intense irradiation power during a test write operation to make it difficult for the light beam spot to follow the track there, the area where the test write operation should be performed could still be reached without passing the destroyed sub-area because the test write zone is used in the opposite direction to the light beam spot traveling. For example, even if the sub-area t5 of the test write zone T0 of the information storage layer L0 has been destroyed with intense irradiation power during the last test write operation, the addresses of the remaining unrecorded test write zones t1, t2, t3 and t4 can still be detected sequentially, and the outermost unused sub-area t4 can be detected, during the next test write operation.

Also, as can be seen from FIG. 2, when the test write zones of the respective information storage layers are used, any pair of adjacent test write zones are used from their farthest ends in mutually opposite directions. For example, the test write zone T0 of the information storage layer L0 starts to be used from a sub-area on its outer peripheral end T0b, while the test write zone T1 of the information storage layer L1 starts to be used from a sub-area on its inner peripheral end T1a. That is why when the test write operation has been performed still a relatively small number of times, the recording power can be determined with the influence of the other layers further reduced.

As described above, an optical disc according to this preferred embodiment has three or more information storage layers, each of which has a test write zone. That is why even if those information storage layers that are stacked one upon the other are irradiated with a laser beam at mutually different intensities or in respectively different thermal environments, a test write operation can still be performed on the target information storage layer, on which a write operation is going to be performed, using its test write zone under the operating environment of that layer. Consequently, the best recording power can be determined for each of those information storage layers.

In addition, those information storage layers are arranged at mutually different radial locations so as not to overlap with each other in the stacking direction. For that reason, the test write operation can be performed just as intended on each information storage layer either without being affected by the writing status on the test write zone of any other information storage layer or at least with such influence minimized. As a result, the recording power can be determined properly for each information storage layer.

What is more, in a situation where the test write zone of each information storage layer is used in the opposite direction to the laser beam that is scanning the information storage layer now, even if any part of the test write zone were destroyed with intense irradiation power, the rest of the test write zone could still be used appropriately. On top of that, the recording power can also be determined properly for each information storage layer without being affected by any other layer.

Hereinafter, a more preferred arrangement of the test write zones T0, T1 and T2 will be described with reference to FIG. 2.

Generally speaking, when the information storage layer L0 needs to be irradiated with a laser beam, the laser beam should pass through the information storage layers L1 and L2. And to irradiate the information storage layer L1 with a laser beam, the laser beam should also pass through the information storage layer L2. That is why the information storage layer L2 needs to have the highest transmittance with respect to a laser beam, and the transmittances of the other information storage layers L1 and L0 will decrease in this order.

To design information storage layers efficiently, if an optical disc with two information storage layers has already been developed, it is preferred that those two information storage layers available be used as the information storage layers L0 and L1 and that only an information storage layer with high transmittance be newly developed as the information storage layer L2.

However, the information storage layer L2 should have high transmittance, and therefore, can be designed much less flexibly. As a result, the write performance of the information storage layer L2 would deteriorate more easily due to a slight variation in a writing condition such as the recording power compared to the information storage layers L0 and L1. The same statement also applies to the information storage layers L1 and L0. That is to say, in general, the higher the transmittance of a given information storage layer, the less flexibly that layer can be designed and the more easily its write performance will deteriorate due to even a slight variation in a writing condition such as the recording power.

For example, if the information storage layer L2 is irradiated with a laser beam, part of the laser beam is transmitted through the information storage layer L2 and then reflected back from the information storage layer L1 toward the information storage layer L2. In that case, if the test write zone T1 of the information storage layer L1 were destroyed or deteriorated, the reflectance of the test write zone T1 would vary significantly. Therefore, the intensity of the laser beam would vary due to the light reflected back from the test write zone T1 toward the information storage layer L2 and stray light. That is why if the test write zones T1 and T2 were arranged close to each other, then the variation in the intensity of the laser beam reflected back from the test write zone T1 toward the information storage layer L2 would be superposed as noise on the laser beam reflected from the test write zone T1. As a result, a test write operation could not be performed appropriately on the test write zone T2 and the recording power could not be determined properly for the information storage layer L2.

In view of this consideration, in the optical disc 101 of this preferred embodiment, the radial gap between the test write zones of two adjacent information storage layers that are located closer to the laser beam incident surface is preferably wider than the gap between those of two adjacent information storage layers that are located more distant from the laser beam incident surface. Specifically, the radial gap between the test write zones T2 and T1 of two adjacent information storage layers L2 and L1 (i.e., the interval between T2$a$ and T1$b$) that are located closer to the surface on which the laser beam 200 is incident is preferably wider than the gap between the test write zones T1 and T0 of two adjacent information storage layers L1 and L0 (i.e., the interval between T0$a$ and T1$b$) that are located more distant from the laser beam incident surface.

Specifically, if the information storage layers L0, L1 and L2 are counted from the one that is located most distant from the surface on which the laser beam 200 is incident, the radial location difference (T2$a$-T1$b$) between the outer peripheral end T1$b$ of the inner one T1 of the test write zones T1 and T2 of the second and third most distant information storage layers L1 and L2 and the inner peripheral end T2$a$ of the other outer test write zone T2 is preferably bigger than the radial location difference (T0$a$-T1$b$) between the outer peripheral end T1$b$ of the inner one T1 of the test write zones T0 and T1 of the most distant and second most distant information storage layers L0 and L1 and the inner peripheral end T0$a$ of the other outer test write zone T0.

According to such an arrangement of test write zones, a wider gap is left between a pair of information storage layers that would be affected more significantly by the light reflected from an adjacent information storage layer, thus reducing the influence of the light reflected from an adjacent information storage layer. As a result, a test write operation can be performed appropriately on the test write zone of each information storage layer and the recording power can be determined properly for the information storage layer. In addition, a narrower gap is left between a pair of information storage layers that would be affected less significantly by the light reflected from an adjacent information storage layer. Then, the gap between the information storage layers will not be unnecessarily wide and the lead-in areas can be used more effectively. On top of that, as there is no need to expand the lead-in area, a sufficiently wide data area can be secured as well.

Optionally, in a situation where the gap between the test write zones of each pair of adjacent information storage layers is defined as described above, the test write zones T0 and T1 of the information storage layers L0 and L1 may be arranged at the same locations as the counterparts of the two information storage layers of a conventional dual-layer optical disc. In that case, even a conventional optical disc drive can also perform a test write operation on the test write zones T0 and T1 of the optical disc 101 of this preferred embodiment only by making a relatively simple change on the sequence.

Such an arrangement of test write zones can be used effectively in a write-once optical disc on which user data can be written only once. However, even if such an arrangement of test write zones is adopted for a rewritable optical disc with at least three information storage layers, on which data can be written optically, the recording power can also be determined properly for each information storage layer without being affected by any adjacent information storage layer.

Specifically, as for a rewritable optical disc, the test write zones T0, T1 and T2 of the information storage layers L0, L1 and L2 may be arranged as shown in FIGS. 5A and 5B.

The arrangement of the test write zones T0, T1 and T2 in the optical disc 102 shown in FIG. 5A is the same as the one shown in FIG. 2. As for a rewritable optical disc, however, the test write zones T0, T1 and T2 may be used in any direction. This is because in a rewritable optical disc, the transmittance of the test write zone T0 can be unchanged if the recording marks left by performing a test write operation are erased. Also, in a rewritable optical disc, any arbitrary sub-areas of the test write zones T0, T1 and T2 can be accessed at random.

Alternatively, in a rewritable optical disc, the test write zones T0, T1 and T2 may also be arranged as in the optical disc 102' shown in FIG. 5B. In that case, the test write zone T2 of the information storage layer L2 is arranged closest to the inner edge of the disc, while the test write zone T1 of the information storage layer L1 is arranged closest to the outer edge thereof. And the test write zone T0 of the information storage layer L0 is arranged closer to the outer edge than the test write zone T2 of the information storage layer L2 is, but closer to the inner edge than the test write zone T1 of the information storage layer L1 is.

Specifically, if the information storage layers are counted from the one that is located most distant from the surface on which the laser beam 200 is incident, the radial location difference (T1a-T2b) between the outer peripheral end T2b of the inner one T2 of the test write zones T1 and T2 of the second and third most distant information storage layers L1 and L2 and the inner peripheral end T1a of the other outer test write zone T1 is preferably bigger than the radial location difference (T1a-T0b) between the outer peripheral end T0b of the inner one T0 of the test write zones T0 and T1 of the most distant and second most distant information storage layers L0 and L1 and the inner peripheral end T1a of the outer test write zone T1 thereof.

In the preferred embodiment described above, the three test write zones T0, T1 and T2 are arranged at mutually different radial locations so as not to overlap with each other. However, if the light reflected from the information storage layer L1 affects a little the information storage layer L2 and if the light transmitted through the information storage layer L2 affects a little the information storage layer L1, then the radial gap between the test write zones T0 and T2 of the information storage layers L0 and L2 in the optical disc 103 shown in FIG. 6 may be narrower than in the arrangement of the test write zones shown in FIG. 2.

Figure 6:
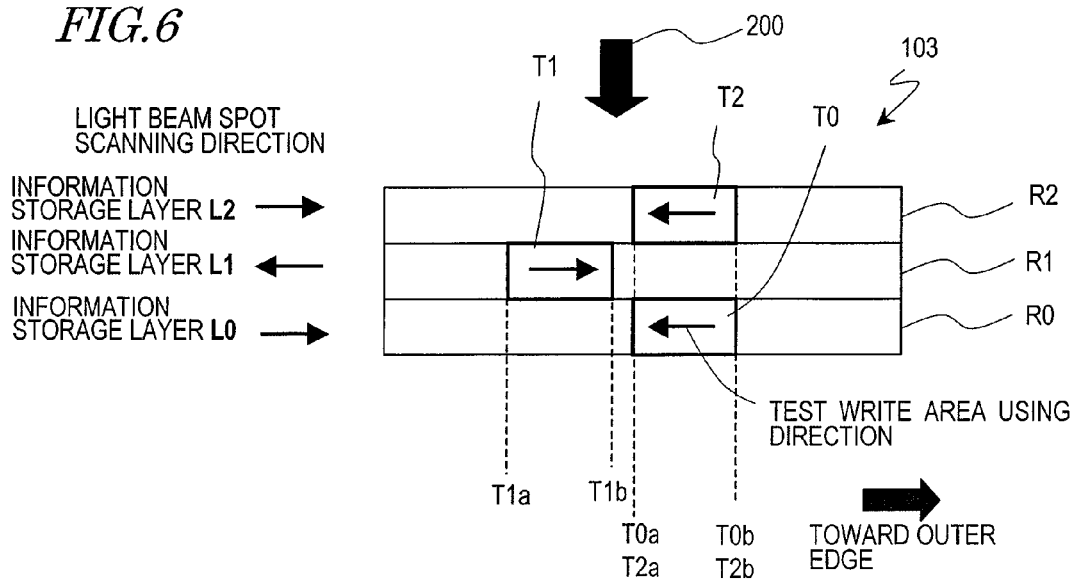
FIG. 6 is a schematic representation illustrating another alternative arrangement of test write zones for the information storage medium of the first preferred embodiment.

Specifically, FIG. 6 illustrates an arrangement of test write zones in a situation where there is the narrowest (i.e., zero) radial gap between the test write zones T0 and T2. Thus, the inner and outer peripheral ends T2a and T2b of the test write zone T2 are perfectly aligned with the inner and outer peripheral ends T0a and T0b of the test write zone T0, and the test write zones T2 and T0 entirely overlap with each other. However, the test write zone T2 may also overlap only partially with the test write zone T0.

That is to say, the test write zone of the information storage layer that is located closer to the surface on which the laser beam 200 is incident may be arranged in the vicinity of that of the information storage layer that is located more distant from the laser beam incident surface. Specifically, if the three information storage layers L0, L1 and L2 are counted from the one that is located most distant from the surface on which the laser beam 200 is incident, the radial location difference between the inner peripheral end T1a of the inner one T1 of the test write zones T0 and T1 of the most distant and second most distant information storage layers L0 and L1 and the outer peripheral end T0b of the other outer test write zone T0 is preferably bigger than the radial location difference between the inner peripheral end T0a of the inner one T0 of the test write zones T0 and T2 of the most distant and third most distant information storage layers L0 and L2 and the outer peripheral end T2b of the other outer test write zone T2.

Figure 7:
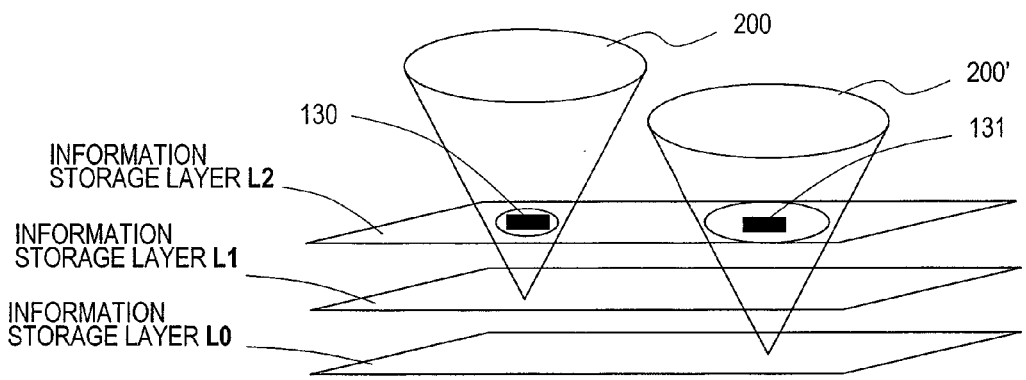
FIG. 7 is a schematic representation illustrating how a deteriorated area on an information storage layer L2 will affect the other information storage layers L0 and L1.

FIG. 7 is a schematic representation illustrating how a deteriorated area on the information storage layer L2 would affect the other information storage layers L0 and L1. Suppose sub-areas included in the test write zone T2 of the information storage layer L2 have been destroyed due to intense irradiation power to form deteriorated areas 130 and 131. Although the deteriorated areas 130 and 131 have the same size, the ratio of the deteriorated area 131 to the spot of the laser beam 200' left on the information storage layer L2 before being focused on the information storage layer L0 is smaller than that of the deteriorated area 130 to the spot of the laser beam 200 left on the information storage layer L2 before being focused on the information storage layer L1. That is why if the sub-areas included in the test write zone T2 have been destroyed, the information storage layer L0 will be affected to a lesser degree than the information storage layer L1. For that reason, the radial gap between the test write zones T0 and T2 of the information storage layers L0 and L2 can be as narrow as in the arrangement of the test write zones shown in FIG. 6. As a result, with the influence of another information storage layer on the test write zone minimized, a test write operation can be performed appropriately on each test write zone and the recording power can be determined properly for each information storage layer. In addition, the lead-in area can be reduced and a sufficiently wide data area can be secured.

In the preferred embodiment shown in FIG. 2, the radial gap between the test write zones T1 and T2 of two adjacent information storage layers L1 and L2 (i.e., the interval between T2a and T1b) that are located closer to the surface on which the laser beam 200 is incident is defined to be wider than the radial gap between the test write zones T0 and T1 of two adjacent information storage layers L0 and L1 (i.e., the interval between T0a and T1b) that are located more distant from the laser beam incident surface. However, if there is a narrower gap in the thickness direction between the information storage layers L0 and L1 than between the information storage layers L1 and L2 (i.e., if the spacer layer 111 is less thick than the spacer layer 112 as shown in FIG. 1), then the influence would be more significant between the information storage layers L0 and L1 than between the information storage layers L1 and L2. In that case, the radial gap between the test write zones T1 and T2 of the information storage layers L1 and L2 that are located closer to the incident surface may be narrower than the radial gap between the test write zones T0 and T1 of the information storage layers L0 and L1 that are located more distant from the incident surface as in the optical disc 104 shown in FIG. 8.

Particularly if the radial gap (or interval) between the test write zones T1 and T2 of two adjacent information storage layers L1 and L2 that are located closer to the laser beam incident surface is reduced to a limit to make the lead-in areas as small as possible, then the radial gap between the test write zones T0 and T1 of two adjacent information storage layers L0 and L1 that are located more distant from the laser beam incident surface is preferably greater than the radial gap (interval) between the test write zones T1 and T2 of two adjacent information storage layers L1 and L2 that are located closer to the laser beam incident surface as in this preferred embodiment. Then, the recording power can be determined properly with the influence of the light reflected from the information storage layer L1 reduced.

In the preferred embodiment described above, the optical disc 101 is supposed to have three information storage layers. However, the present invention is also applicable to an optical disc with four or more information storage layers. In that case, among those four or more information storage layers L0, L1, L2, etc., the information storage layer that is located most distant from the laser beam incident surface is preferably the layer L0, the information storage layer adjacent to the layer L0 is layer L1, and so forth.

Embodiment 2

Hereinafter, a second preferred embodiment of an information storage medium according to the present invention will be described with reference to the accompanying drawings. The information storage medium of this preferred embodiment is also either a write-once type or a rewritable type. The optical disc of the second preferred embodiment further includes an additional information storage layer L3, i.e., has four information storage layers overall, unlike the optical disc 101 of the first preferred embodiment described above. That is to say, in the structure of the optical disc 101 shown in FIG. 1, the information storage layer L3 is added between the information storage layer L2 and the cover layer 113 and another spacer layer is inserted between the information storage layers L3 and L2.

FIG. 9 is a schematic cross-sectional view of an optical disc 105 as a second preferred embodiment of the present invention. No spacer layers are shown as in FIG. 2. As shown in FIG. 9, a lead-in area R3 is arranged in an inner portion of the information storage layer L3 that has been added to the structure of the optical disc 101 and there is a test write zone T3 in the lead-in area R3.

As shown in FIG. 9, test write zones T0, T1, T2, T3 are located in the lead-in areas R0, R1, R2 and R3 of the information storage layers L0, L1, L2 and L3, respectively. These test write zones T0, T1, T2 and T3 are arranged at mutually different radial locations so as not to overlap with each other at all in the direction in which these information storage layers L0, L1, L2 and L3 are stacked one upon the other (i.e., as viewed in the direction in which the laser beam 200 comes).

More specifically, in the optical disc 105, the inner peripheral end T1a of the test write zone T1 of the second innermost information storage layer L1 is located closer to the outer edge of the disc than the outer peripheral end T3b of the test write zone T3 of the innermost information storage layer L3, and a gap (or an interval) is left between them so that the test write zones do not overlap with each other. This gap has a distance that is defined by the difference between the respective radial locations of the inner peripheral end T1a and the outer peripheral end T3b.

Likewise, the inner peripheral end T0a of the test write zone T0 of the third innermost information storage layer L0 is located closer to the outer edge of the disc than the outer peripheral end T1b of the test write zone T1 of the second innermost information storage layer L1, and a gap that is defined by the difference between the respective radial locations of the inner peripheral end T0a and the outer peripheral end T1b is left between them.

Also, the inner peripheral end T2a of the test write zone T2 of the outermost information storage layer L2 is located closer to the outer edge of the disc than the outer peripheral end T0b of the test write zone T0 of the third innermost information storage layer L0, and a gap that is defined by the difference between the respective radial locations of the inner peripheral end T2a and the outer peripheral end T0b is left between them.

If the four information storage layers L0, L1, L2 and L3 are counted from the one that is located most distant from the surface on which the laser beam 200 is incident, the test write zone T2 of the third most distant information storage layer L2 is located closer to the outer edge of the disc than the test write zone T0 of the most distant information storage layer L0 is. And the test write zone T0 of the information storage layer L0 is located closer to that outer edge than the test write zone T1 of the second most distant information storage layer L1 is.

Also, the test write zone T2 of the information storage layer L2 is located closer to the outer edge of the disc than the test write zone of the information storage layer L1 is. And the test write zone T1 of the information storage layer L1 is located closer to that outer edge than the test write zone T3 of the fourth most distant information storage layer L3 is.

Furthermore, the test write zone T2 of the third most distant information storage layer L2 is located closer to the outer edge of the disc than the test write zone T0 of the information storage layer L0 is. And the test write zone T0 of the information storage layer L0 is located closer to that outer edge than the test write zone T3 of information storage layer L3 is.

As in the first preferred embodiment described above, according to the arrangement of the test write zones of this preferred embodiment shown in FIG. 9, the test write zones T0, T1, T2 and T3 are arranged at mutually different radial locations, and do not overlap with each other at all in the direction in which the information storage layers are stacked one upon the other. That is why even if the test write zone T1 of the information storage layer L1 were destroyed, the laser beam could still reach the test write zone T0 of the information storage layer L0 without (or at least almost without) being affected by the test write zone T1 destroyed. Consequently, a test write operation could be performed just as intended on the test write zone T0 of the information storage layer L0 and the recording power could still be determined properly for the information storage layer L0. Likewise, even if the test write zone T2 or T3 of the information storage layer L2 or L3 were destroyed, the recording powers could still be determined properly for the information storage layers L0, L1 and L2.

Also, for the same reason, even if the transmittance of the laser beam passing through any of the test write zones T0, T1, T2 and T3 varied, the laser beam could still reach the test write zone T0, T1, T2, T3 of each information storage layer L0, L1, L2, L3. Consequently, a test write operation could be performed just as intended on the test write zone T0, T1, T2, T3 of each information storage layer L0, L1, L2, L3 and the recording power could still be determined properly for every information storage layer L0, L1, L2, L3.

Next, it will be described in which directions the test write zones T0, T1, T2 and T3 are used. As indicated by the arrows in FIG. 9, the tracks are arranged on the information storage layers L0 and L2 so that the laser beam scans the information storage layers L0 and L2 outward (i.e., from some inner radial location on the disc toward the outer edge thereof). On the information storage layers L1 and L3, on the other hand, the tracks are arranged so that the laser beam scans the information storage layers L1 and L3 inward (i.e., from some outer radial location on the disc toward the inner edge thereof). Thus, as in the first preferred embodiment described above, information can be read or written without making the laser beam spot jump all the way toward the innermost or outermost location on the optical disc 105 every time the target layers need to be changed into the next information storage layer.

Meanwhile, as in the first preferred embodiment described above, the test write zones T0, T1, T2 and T3 are preferably used in opposite directions to the ones in which the laser beam spot goes on the respective information storage layers. Thus, as already described for the first preferred embodiment, even if any sub-area of the test write zone were destroyed with too intense irradiation power during a test write operation to make it difficult for the light beam spot to follow the track there, the area where the test write operation should be performed could still be reached without passing the destroyed sub-area because the test write zone is used in the opposite direction to the light beam spot traveling. Also, when the test write operation has been performed still a relatively small number of times, the recording power can be determined properly with the influence of the other layers further reduced.

In the preferred embodiment described above, the optical disc 105 is supposed to have four information storage layers. However, the present invention can also be used effectively even in an optical disc with more than four information storage layers. In that case, if there are n information storage layers (where n is an integer that is equal to or greater than three) and if those n information storage layers are counted from the one that is located most distant from the laser beam incident surface, an $i^{th}$ information storage layer (where i is an even number that satisfies $2 \leq i \leq n$) is scanned with the laser beam toward the inner edge of the disc but the sub-areas of its test write zone are used toward the outer edge of the disc. On the other hand, an $(i-1)^{th}$ information storage layer is scanned with the laser beam toward the outer edge of the disc but the sub-areas of its test write zone are used toward the inner edge of the disc.

As described above, an optical disc according to this preferred embodiment has three or more information storage layers, each of which has a test write zone. That is why even if those information storage layers that are stacked one upon the other are irradiated with a laser beam at mutually different intensities or in respectively different thermal environments, a test write operation can still be performed on the target information storage layer, on which a write operation is going to be performed, using its test write zone under the operating environment of that layer. Consequently, the best recording power can be determined for each of those information storage layers.

In addition, those information storage layers are arranged at mutually different radial locations so as not to overlap with each other in the stacking direction. For that reason, the test write operation can be performed just as intended on each information storage layer either without being affected by the writing status on the test write zone of any other information storage layer or at least with such influence minimized. As a result, the recording power can be determined properly for each information storage layer.

What is more, in a situation where the test write zone of each information storage layer is used in the opposite direction to the laser beam that is scanning the information storage layer now, even if any part of the test write zone were destroyed with intense irradiation power, the rest of the test write zone could still be used appropriately. On top of that, the recording power can also be determined properly for each information storage layer without being affected by any other layer.

As in the first preferred embodiment described above, there is a more preferred arrangement of the test write zones T0, T1, T2 and T3. Hereinafter, such an arrangement will be described with reference to FIG. 9.

Generally speaking, when the information storage layer L0 needs to be irradiated with a laser beam, the laser beam should pass through the information storage layers L1, L2 and L3. And to irradiate the information storage layer L2 with a laser beam, the laser beam should also pass through the information storage layer L3. That is why the information storage layer L3 needs to have the highest transmittance with respect to a laser beam, and the transmittances of the other information storage layers L2, L1 and L0 will decrease in this order.

To design information storage layers efficiently, if an optical disc with three information storage layers has already been developed, it is preferred that those three information storage layers available be used as the information storage layers L0, L1 and L2 and that only an information storage layer with high transmittance be newly developed as the information storage layer L3.

However, the information storage layer L3 should have high transmittance, and therefore, can be designed much less flexibly. As a result, the write performance of the information storage layer L3 would deteriorate more easily due to a slight variation in a writing condition such as the recording power compared to the information storage layers L0, L1 and L2. The same statement also applies to between the information storage layers L2 and L1 and between the information storage layers L1 and L0. That is to say, in general, the higher the transmittance of a given information storage layer, the less flexibly that layer can be designed and the more easily its write performance will deteriorate due to even a slight variation in a writing condition such as the recording power.

For example, if the information storage layer L3 is irradiated with a laser beam, part of the laser beam is transmitted through the information storage layer L3 and then reflected back from the information storage layer L2 toward the information storage layer L3. In that case, if the test write zone T2 of the information storage layer L2 were destroyed or deteriorated, the reflectance of the test write zone T2 would vary significantly. Therefore, the intensity of the laser beam would vary due to the light reflected back from the test write zone T2 toward the information storage layer L3 and stray light. That is why if the test write zones T2 and T3 were arranged close to each other, then the variation in the intensity of the laser beam reflected back from the test write zone T2 toward the information storage layer L3 would be superposed as noise on the laser beam reflected from the test write zone T2. As a result, a test write operation could not be performed appropriately on the test write zone T3 and the recording power could not be determined properly for the information storage layer L3.

In view of this consideration, in the optical disc 105 of this preferred embodiment, the radial gap between the test write zones of two adjacent information storage layers that are located closer to the laser beam incident surface is preferably wider than the gap between those of two adjacent information storage layers that are located more distant from the laser beam incident surface. Specifically, the radial gap between the test write zones T2 and T1 of two adjacent information storage layers L2 and L1 (i.e., the gap between T2a and T1b) that are located closer to the surface on which the laser beam 200 is incident is preferably wider than the gap between the test write zones T1 and T0 of two adjacent information storage layers L1 and L0 (i.e., the gap between T0a and T1b) that are located more distant from the laser beam incident surface.

Also, the radial gap between the test write zones T3 and T2 of two adjacent information storage layers L3 and L2 (i.e., the gap between T2a and T3b) that are located closer to the surface on which the laser beam 200 is incident is preferably wider than the gap between the test write zones T1 and T0 of two adjacent information storage layers L1 and L0 (i.e., the gap between T0a and T1b) that are located more distant from the laser beam incident surface or the gap between the test write zones T2 and T1 of two adjacent information storage layers L2 and L1 (i.e., the gap between T2a and T1b).

Specifically, if those information storage layers L0, L1, L2 and L3 are counted from the one that is located most distant from the surface of the disc on which the laser beam 200 is incident, the radial location difference between the outer peripheral end of the inner one of the test write zones of $i^{th}$ and $(i+1)^{th}$ information storage layers (where i is an integer that satisfies $2 \leq i \leq 3$) and the inner peripheral end of the other outer test write zone is preferably wider than the radial location difference between the outer peripheral end of the inner one of the test write zones of $j^{th}$ and $(j+1)^{th}$ information storage layers (where j is an integer that satisfies $1 \leq j \leq i-1$) and the inner peripheral end of the other outer test write zone.

In the preferred embodiment described above, the optical disc 105 is supposed to have four information storage layers. However, the present invention can also be used effectively in an optical disc with more than four information storage layers. In that case, the relations described above are satisfied if n is the number of information storage layers included in the optical disc and is an integer that is equal to or greater than three and if i is an integer that satisfies $2 \leq i \leq n-1$.

According to such an arrangement of test write zones, a wider gap is left between a pair of information storage layers that would be affected more significantly by the light reflected from an adjacent information storage layer, thus reducing the influence of the light reflected from an adjacent information storage layer. As a result, a test write operation can be performed appropriately on the test write zone of each information storage layer and the recording power can be determined properly for the information storage layer. In addition, a narrower gap is left between a pair of information storage layers that would be affected less significantly by the light reflected from an adjacent information storage layer. Then, the gap between the information storage layers will not be unnecessarily wide and the lead-in areas can be used more effectively. On top of that, as there is no need to expand the lead-in area, a sufficiently wide data area can be secured as well.

Optionally, in a situation where the gap between the test write zones of each pair of adjacent information storage layers is defined as described above, the test write zones T0 and T1 of the information storage layers L0 and L1 may be arranged at the same locations as the counterparts of the two information storage layers of a conventional dual-layer optical disc. In that case, even a conventional optical disc drive can also perform a test write operation on the test write zones T0 and T1 of the optical disc 101 of this preferred embodiment only by making a relatively simple change on the sequence.

In the preferred embodiment described above, the four test write zones T0, T1, T2 and T3 are arranged at mutually different radial locations so as not to overlap with each other. However, as already described with reference to FIG. 7, if the light reflected from the information storage layer L2 affects a little the information storage layer L3, if the light transmitted through the information storage layer L3 affects a little the information storage layer L2 or L1, and if the light transmitted through the information storage layer L2 affects a little the information storage layer L0, then the radial gap between the test write zones T0 and T2 of the information storage layers L0 and L2 and the radial gap between the test write zones T1 and T3 of the information storage layers L1 and L3 in the optical disc 106 shown in FIG. 10 may be shorter than in the arrangement of the test write zones shown in FIG. 9.

Specifically, FIG. 10 illustrates an arrangement of test write zones in a situation where there is a zero radial gap between the test write zones T0 and T2 and between the test write zones T1 and T3. Thus, the inner and outer peripheral ends T2a and T2b of the test write zone T2 are perfectly aligned with the inner and outer peripheral ends T0a and T0b of the test write zone T0, and the test write zones T2 and T0 entirely overlap with each other. In addition, the inner and outer peripheral ends T3a and T3b of the test write zone T3 are perfectly aligned with the inner and outer peripheral ends T1a and T1b of the test write zone T1, and the test write zones T3 and T1 entirely overlap with each other. However, the test write zone T2 may also overlap with the test write zone T0 only partially and the test write zone T3 may also overlap with the test write zone T1 only partially.

That is to say, the test write zone of the information storage layer that is located closer to the surface on which the laser beam 200 is incident may be arranged in the vicinity of that of the information storage layer that is located more distant from the laser beam incident surface. Specifically, if the four information storage layers L0, L1, L2 and L3 are counted from the one that is located most distant from the surface on which the laser beam 200 is incident, the radial location difference between the inner peripheral end of the inner one of the test write zones of the $k^{th}$ and $(k+1)^{th}$ information storage layers (where k is an integer that satisfies $1 \leq k \leq 2$) and the outer peripheral end of the other outer test write zone is may be greater than the radial location difference between the inner peripheral end of the inner one of the test write zones of the $k^{th}$ and $(k+2)^{th}$ information storage layers and the outer peripheral end of the other outer test write zone.

Also, the radial location difference between the inner peripheral end T1a of the inner one T1 of the test write zones T1 and T2 of the information storage layers L1 and L2 and the outer peripheral end T2b of the other outer test write zone T2 may be greater than the radial location difference between the inner peripheral end T3a of the inner one T3 of the test write zones T1 and T3 of the information storage layers L1 and L3 and the outer peripheral end T1b of the other outer test write zone T1.

In the preferred embodiment described above, the optical disc 105 is supposed to have four information storage layers. However, the present invention can also be used effectively in an optical disc with more than four information storage layers. In that case, the former relation described above is satisfied if n is the number of information storage layers included in the optical disc and is an integer that is equal to or greater than three and if k is an integer that satisfies $1 \leq k \leq n-2$.

On the other hand, according to the latter relation, the radial location difference between the inner peripheral end of the inner one of the test write zones of $k'^{th}$ and $(k'+1)^{th}$ information storage layers (where k' is an integer that satisfies $1 \leq k' \leq n-3$) and the outer peripheral end of the other outer test write zone is preferably greater than the radial location difference between the inner peripheral end of the inner one of the test write zones of $(k'+1)^{th}$ and $(k'+3)^{th}$ information storage layers and the outer peripheral end of the other outer test write zone.

As a result, with the influence of another information storage layer on the test write zone minimized, a test write operation can be performed appropriately on each test write zone and the recording power can be determined properly for each information storage layer. In addition, the lead-in area can be reduced and a sufficiently wide data area can be secured.

Optionally, if the light transmitted through the information storage layer L3 affects a little the information storage layer L1, then the radial gap between the test write zones T1 and T3 of the information storage layers L1 and L3 may be reduced as in the optical disc 107 shown in FIG. 11. Although an example in which there is no radial gap between the test write zones T1 and T3 is illustrated in FIG. 11, the test write zone T3 may also be arranged so as to partially overlap with the test write zone T1. Then, the lead-in area can also be reduced and a sufficiently wide data area can also be secured.

Figure 12:
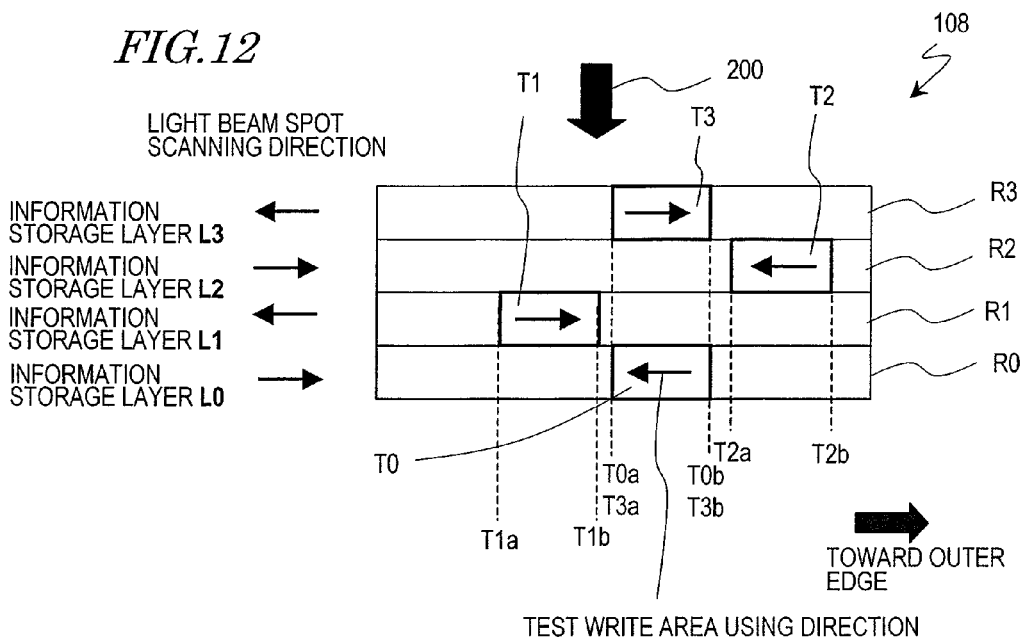
FIG. 12 is a schematic representation illustrating another alternative arrangement of test write zones for the information storage medium of the second preferred embodiment.

Also, if the light transmitted through the information storage layer L3 affects a little the information storage layer L0 or L2 and if the light reflected from the information storage layer L2 affects a little the information storage layer L3, then the radial gap between the test write zones T0 and T3 of the information storage layers L0 and L3 and the radial gap between the test write zones T3 and T2 may be reduced as in the optical disc 108 shown in FIG. 12. Although an example in which there is no radial gap between the test write zones T0 and T3 is illustrated in FIG. 12, the test write zone T3 may also be arranged so as to partially overlap with the test write zone T0. Then, the lead-in area can also be reduced and a sufficiently wide data area can also be secured.

In the first and second preferred embodiments, the optical disc of the present invention has been described as having three or four information storage layers. However, the present invention is in no way limited to those specific preferred embodiments. Alternatively, an optical disc according to the present invention may also have five or more information storage layers.

Embodiment 3

Figure 13:
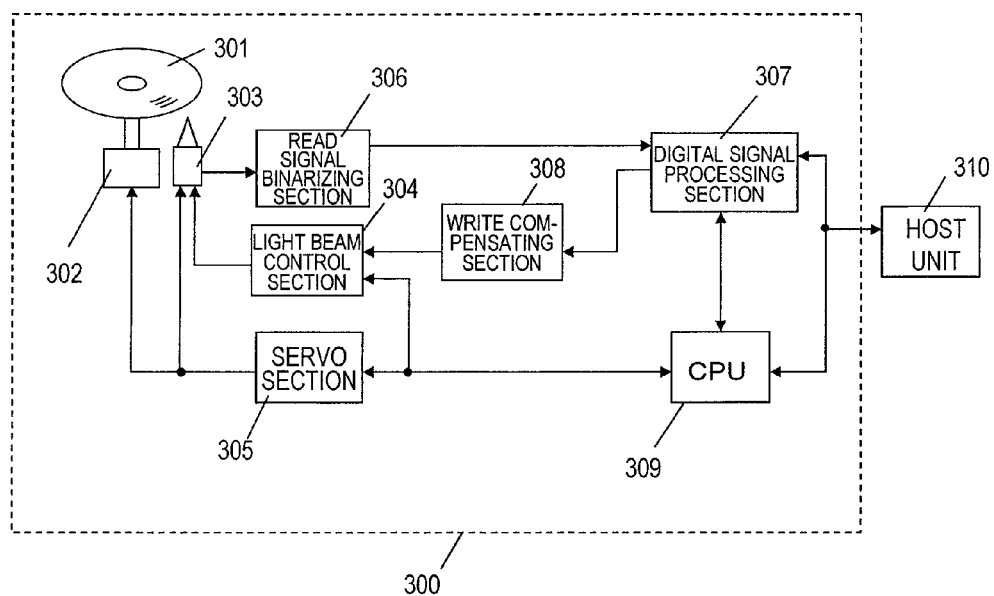
FIG. 13 is a block diagram illustrating a preferred embodiment of an information writing device according to the present invention.

Hereinafter, preferred embodiments of an information writing device, an information reading device, a writing method and a reading method according to the present invention will be described with reference to the accompanying drawings. FIG. 13 is a block diagram illustrating an information writing device 300 as a third preferred embodiment of the present invention. The information writing device 300 can read and write data and includes a spindle motor 302, an optical head 303, a light beam control section 304, a servo section 305, a read signal binarizing section 306, a digital signal processing section 307, a write compensating section 308 and a CPU 309.

The optical disc 301 may be what has already been described as the first or second preferred embodiment of the present invention. In this preferred embodiment, the optical disc 101 of the first preferred embodiment is used as the optical disc 301. The spindle motor 302 rotates the optical disc 301 at a predetermined velocity. The optical head 303 irradiates the optical disc 301 with a light beam and also converts the light beam that has been reflected from the optical disc 301 into an electrical signal and outputs it as a read signal. The light beam control section 304 controls the irradiation power of the light beam that has been supplied from the optical head 303 in accordance with the instruction given by the CPU 309.

The servo section 305 controls the positions of the optical head 303 and the light beam emitted from the optical head 303, performs the focus and tracking controls on the light beam, and controls the rotation of the spindle motor 302. The read signal binarizing section 306 subjects the read signal generated by the optical head 303 (of which the data information is a sum signal and the information about the disc information area and address is a differential signal) to amplification and binarization, thereby generating a binarized signal. Also, the read signal binarizing section 306 gets a clock signal generated by an internal PLL (not shown) synchronously with the binarized signal.

The digital signal processing section 307 subjects the binarized signal to predetermined types of demodulation and error correction processing. In writing data, the digital signal processing section 307 subjects the data to be written to addition of a error correction code and a predetermined kind of modulation, thereby generating modulated data. Next, the write compensating section 308 converts the modulated data into optically modulated data consisting of pulse trains, and finely adjusts the pulse width and other parameters of the optically modulated data based on the read signal obtained from the data information area and the data that is stored in advance in the CPU 309, thereby converting the optically modulated data into a write pulse signal that will contribute to forming pits effectively.

The CPU 309 controls the entire information writing device 300. The host unit 310 uses a computer (not shown), an application (not shown) and an operating system (not shown) to send a read/write request to the optical disc drive 300.

When the information writing device 300 is loaded with the optical disc 301, the light beam control section 304 and the servo section 305 instruct the optical head 303 to scan the control area in the lead-in area R0 on the information storage layer L0 with predetermined irradiation power, thereby retrieving recording parameter information such as information about the irradiation power to adopt when a write operation is performed on the information storage layers L0, L1 and L2.

On receiving a write request from the host unit 310, the light beam control section 304 and the servo section 305 make the optical head 303 scan the test write zone T0 in the lead-in area R0 of the information storage layer L0 with predetermined irradiation power. Meanwhile, the CPU 309 specifies the irradiation power for performing the test write operation for the light beam control section 304 and gets test data written by the optical head 303 with multiple different irradiation powers and then read, thereby determining, based on the error rate and jitter of the read signal generated, the recording power to use when a write operation is performed on the data area D0 of the information storage layer L0.

The same series of operations are also performed on the information storage layers L1 and L2, too. Specifically, the light beam control section 304 and the servo section 305 make the optical head 303 scan the test write zone T1 in the lead-in area R1 of the information storage layer L1 with predetermined irradiation power. Meanwhile, the CPU 309 specifies the irradiation power for performing the test write operation for the light beam control section 304 and gets test data written by the optical head 303 with multiple different irradiation powers and then read, thereby determining, based on the error rate and jitter of the read signal generated, the recording power to use when a write operation is performed on the data area D1 of the information storage layer L1.

Subsequently, the light beam control section 304 and the servo section 305 make the optical head 303 scan the test write zone T2 in the lead-in area R2 of the information storage layer L2 with predetermined irradiation power. Meanwhile, the CPU 309 specifies the irradiation power for performing the test write operation for the light beam control section 304 and gets test data written by the optical head 303 with multiple different irradiation powers and then read, thereby determining, based on the error rate and jitter of the read signal generated, the recording power to use when a write operation is performed on the data area D2 of the information storage layer L2. In this manner, the recording powers for writing information on the respective data areas D0, D1 and D2 of all three information storage layers L0, L1 and L2 are determined.

Next, by irradiating the disc with a laser beam with the recording power thus determined, user data gets written on the data area D0, D1 or D2 of each information storage layer L0, L1 or L2. In this case, the irradiation power that has been determined for each information storage layer through the procedure described above is used.

When the user data that has been written on the data area D0, D1 or D2 of each information storage layer L0, L1 or L2 needs to be read, disc information and other pieces of information are retrieved from the control area and the user data is read from the data area D0, D1 or D2 using the disc information thus obtained.

In the preferred embodiment described above, the test write zones T0, T1 and T2 are supposed to be arranged only on the inner periphery of the disc. Optionally, additional test write zones may also be arranged on the outer periphery of the disc. Also, when a write request is received, the recording power for performing a write operation on the data area D0, D1 or D2 of every information storage layer L0, L1 or L2 is determined in the preferred embodiment described above. However, if the CPU 309 has decided that it should be enough to perform a write operation only on the information storage layer L0 to get every piece of information written, then only the irradiation power for performing a write operation on the data area D0 needs to be determined. Then, the user data can start being written in a shorter time.

Furthermore, in the preferred embodiment described above, when a write request is received, the recording power for performing a write operation on the data area of every information storage layer is determined. However, the CPU 309 may determine the recording power only for the information storage layer on which the write operation is performed earliest, and may determine the recording powers for the other information storage layers later. Then, the user data can start being written more quickly.

For example, if the test write operation should be performed on the inner and outer peripheries of each of the three information storage layers of a three-layer disc, then the same test write sequence should be performed six times overall, thus forcing the user to wait a long time before his or her data is ready to be written.

To avoid such a situation, multiple combinations of specific information storage layer(s) on which the test write operation needs to be performed and the number of such layer(s) may be prepared in advance. Then, the CPU 309 may determine whether or not the write operation should be performed on more than two storage layers. And if the answer is NO, the test write operation may be performed only on the information storage layers L0 and L1. Then, the user data can also start being written more quickly.

Embodiment 4

Examples of storage media to which the present invention is applicable include Blu-ray Disc (BD) and sundry other optical discs compliant with different standards. In the following description, an application of an optical disc according to the first or second preferred embodiment of the present invention to a BD will be described as a fourth preferred embodiment of the present invention.

Main Parameters

BDs are classified according to the property of their recording film into various types. Examples of those various BDs include a BD-ROM (read-only), a BD-R (write-once), and a BD-RE (rewritable). And the present invention is applicable to any type of BD or an optical disc compliant with any other standard, no matter whether the storage medium is a ROM (read-only), an R (write-once) or an RE (rewritable). Main optical constants and physical formats for Blu-ray Discs are disclosed in "Blu-ray Disc Reader" (published by Ohmsha, Ltd.) and on White Paper at the website of Blu-ray Disc Association (http://www.blu-raydisc.com), for example.

Specifically, as for a BD, a laser beam with a wavelength of approximately 405 nm (which may fall within the range of 400 nm to 410 nm supposing the tolerance of errors is ±5 nm with respect to the standard value of 405 nm) and an objective lens with an NA (numerical aperture) of approximately 0.85 (which may fall within the range of 0.84 to 0.86 supposing the tolerance of errors is ±0.01 with respect to the standard value of 0.85) are used. A BD has a track pitch of about 0.32 μm (which may fall within the range of 0.310 to 0.330 μm supposing the tolerance of errors is ±0.010 μm with respect to the standard value of 0.320 μm) and has one or two information storage layers. A BD has a single-sided single-layer or a single-sided dual-layer structure on the laser beam incident side, and its storage plane or storage layer is located at a depth of 75 μm to 100 μm as measured from the surface of the protective coating of the BD.

A write signal is supposed to be modulated by 17PP modulation technique. Recording marks are supposed to have the shortest mark length of 0.149 μm or 0.138 μm (which is the length of a 2T mark, where T is one cycle of a reference clock pulse and a reference period of modulation in a situation where a mark is recorded in accordance with a predetermined modulation rule), i.e., a channel bit length T of 74.50 nm or 69.00 nm. The BD has a storage capacity of 25 GB or 27 GB (more exactly, 25.025 GB or 27.020 GB) if it is a single-sided, single-layer disc but has a storage capacity of 50 GB or 54 GB (more exactly, 50.050 GB or 54.040 GB) if it is a single-sided, dual-layer disc.

The channel clock frequency is supposed to be 66 MHz (corresponding to a channel bit rate of 66.000 Mbit/s) at a standard BD transfer rate (BD 1×), 264 MHz (corresponding to a channel bit rate of 264.000 Mbit/s) at BD 4× transfer rate, 396 MHz (corresponding to a channel bit rate of 396.000 Mbit/s) at BD 6× transfer rate, and 528 MHz (corresponding to a channel bit rate of 528.000 Mbit/s) at BD 8× transfer rate.

And the standard linear velocity (which will also be referred to herein as "reference linear velocity" or "1×") is supposed to be 4.917 m/sec or 4.554 m/sec. The 2×, 4×, 6× and 8× linear velocities are 9.834 m/sec, 19.668 m/sec, 29.502 m/sec, and 39.336 m/sec, respectively. A linear velocity higher than the standard linear velocity is normally a positive integral number of times as high as the standard linear velocity. But the factor does not have to be an integer but may also be a positive real number. Optionally, a linear velocity that is lower than the standard linear velocity (such as a 0.5× linear velocity) may also be defined.

It should be noted that these parameters are those of single-layer or dual-layer BDs already on the market, which have a storage capacity of approximately 25 GB or approximately 27 GB per layer. To further increase the storage capacities of BDs, high-density BDs with a storage capacity of approximately 32 GB or approximately 33.4 GB per layer and three- or four-layer BDs have already been researched and developed. Hereinafter, exemplary applications of the present invention to such BDs will be described.

Structure with Multiple Information Storage Layers

Figure 14:
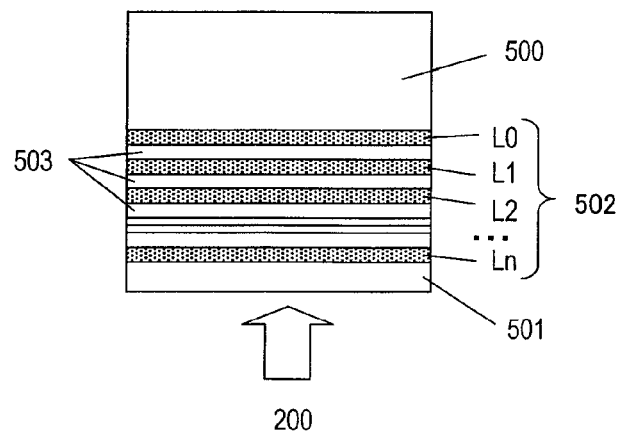
FIG. 14 is a schematic representation illustrating the structure of an information storage medium as a fourth preferred embodiment of the present invention.
Figure 15:
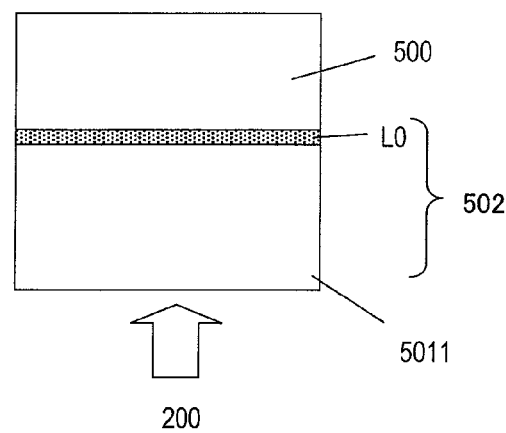
FIG. 15 is a schematic representation illustrating the structure of a single-layer information storage medium.
Figure 16:
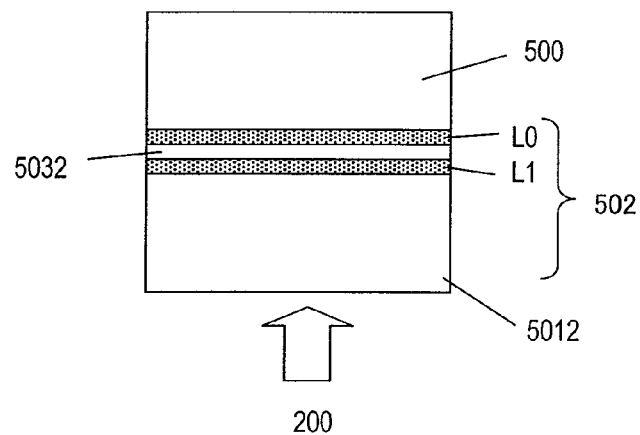
FIG. 16 is a schematic representation illustrating the structure of a dual-layer information storage medium.
Figure 17:
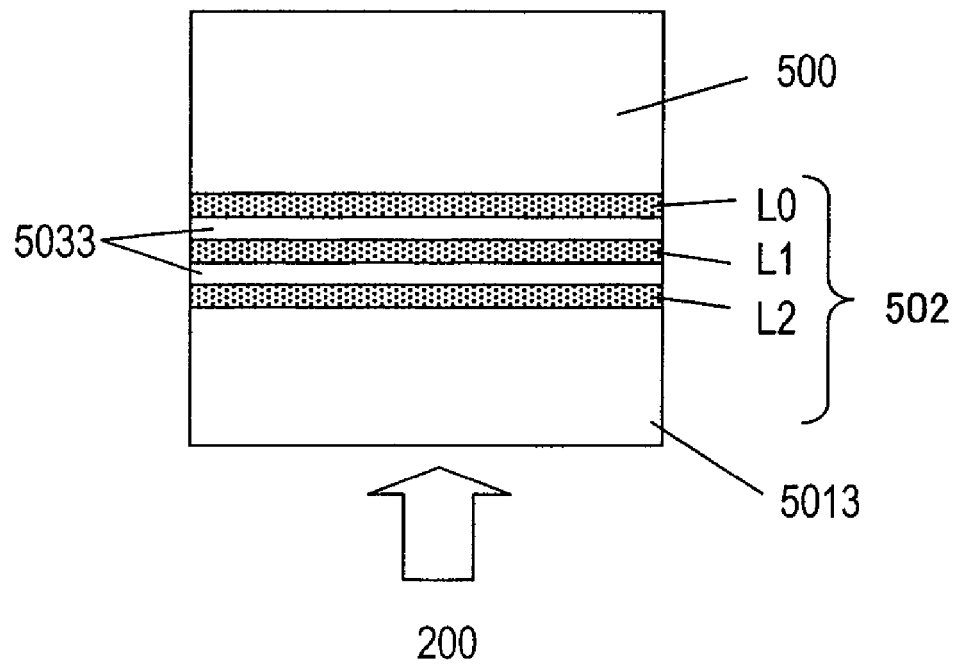
FIG. 17 is a schematic representation illustrating the structure of a three-layer information storage medium.
Figure 18:
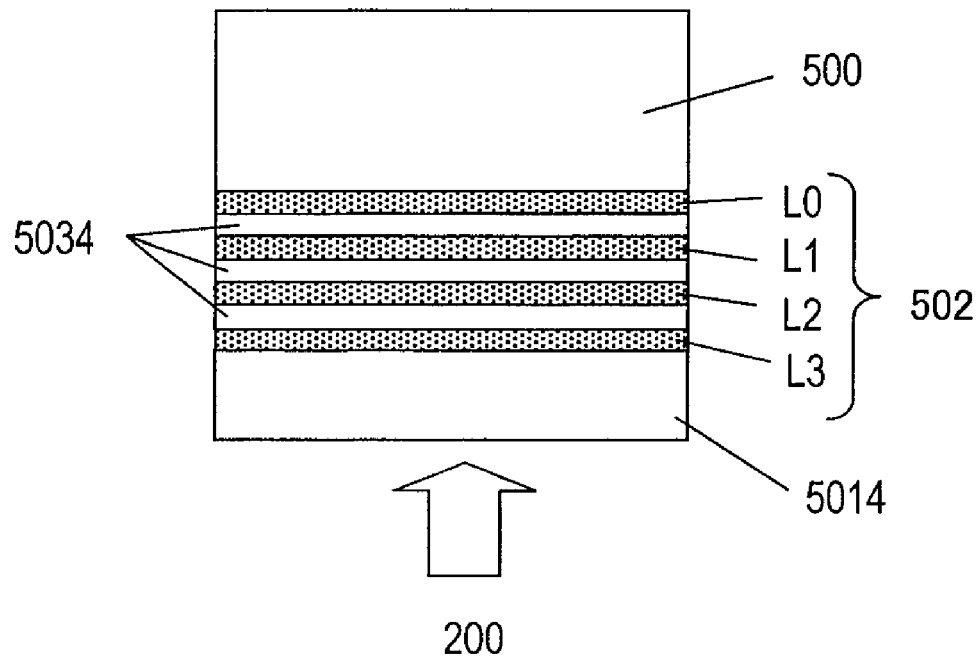
FIG. 18 is a schematic representation illustrating the structure of a four-layer information storage medium.

For example, supposing the optical disc is a single-sided disc, from/on which information is read and/or written by having a laser beam incident on the protective coating (cover layer) side, if two or more information storage layers need to be provided, then those multiple information storage layers should be arranged between the substrate and the protective coating. An exemplary structure for such a multilayer disc is shown in FIG. 14. The optical disc shown in FIG. 14 has (n+1) information storage layers 502 (where n is an integer that is more than zero). Specifically, in this optical disc, a cover layer 501, (n+1) information storage layers (layers Ln through L0)

502, and a substrate 500 are stacked in this order on the surface on which a laser beam 200 is incident. Also, between each pair of adjacent ones of the (n+1) information storage layers 502, inserted as an optical buffering member is a spacer layer 503. That is to say, the reference layer L0 may be arranged at the deepest level that is located at a predetermined depth from the light incident surface (i.e., at the greatest distance from the light source). Multiple information storage layers L1, L2, . . . and Ln may be stacked one upon the other from over the reference layer L0 toward the light incident surface.

In this case, the depth of the reference layer L0 as measured from the light incident surface of the multi-layer disc may be equal to the depth (e.g., approximately 0.1 mm) of the only information storage layer of a single-layer disc as measured from the light incident surface. If the depth of the deepest layer (i.e., the most distant layer) is constant irrespective of the number of storage layers stacked (i.e., if the deepest layer of a multilayer disc is located at substantially the same distance as the only information storage layer of a single-layer disc), compatibility can be ensured in accessing the reference layer, no matter whether the given disc is a single-layer one or a multilayer one. In addition, even if the number of storage layers stacked increases, the influence of tilt will hardly increase. This is because although the deepest layer is affected by tilt most, the depth of the deepest layer of a multilayer disc is approximately the same as that of the only information storage layer of a single-layer disc, and does not increase in this case even if the number of storage layers stacked is increased.

As for the beam spot moving direction (which will also be referred to herein as a "tracking direction" or a "spiral direction"), the optical disc may be either a parallel path type or an opposite path type. In a disc of the parallel path type, the spot goes in the same direction on every layer, i.e., from some inner radial location toward the outer edge of the disc or from some outer radial location toward the inner edge of the disc on every information storage layer.

On the other hand, in a disc of the opposite path type, the spot moving directions are changed into the opposite one every time the layers to scan are changed from an information storage layer into an adjacent one. For example, if the spot on the reference layer L0 goes from some inner radial location toward the outer edge (which direction will be simply referred to herein as "outward"), then the spot on the information storage layer L1 will go from some outer radial location toward the inner edge (which direction will be simply referred to herein as "inward"), the spot on the information storage layer L2 will go outward, and so forth. That is to say, the spot on the information storage layer Lm (where m is either zero or an even number) will go outward but the spot on the information storage layer Lm+1 will go inward. Conversely, the spot on the information storage layer ln (where m is either zero or an even number) will go inward but the spot on the information storage layer Lm+1 will go outward.

As for the thickness of the protective coating (cover layer), to minimize the influence of spot distortion due to either a decrease in focal length with an increase in numerical aperture NA or the tilt, the protective coating may have its thickness reduced. A numerical aperture NA is defined to be 0.45 for a CD, 0.65 for a DVD, but approximately 0.85 for a BD. For example, if the information storage medium has an overall thickness of approximately 1.2 mm, the protective coating may have a thickness of 10 μm to 200 μm. More specifically, a single-layer disc may include a transparent protective coating with a thickness of approximately 0.1 mm and a substrate with a thickness of approximately 1.1 mm. On the other hand, a dual-layer disc may include a protective coating with a thickness of approximately 0.075 mm, a spacer layer with a thickness of approximately 0.025 mm and a substrate with a thickness of approximately 1.1 mm.

Configurations for Single- to Four-Layer Discs

FIGS. 15, 16, 17 and 18 illustrate exemplary configurations for single-layer, dual-layer, three-layer and four-layer discs, respectively. As described above, if the distance from the light incident surface to the reference layer L0 is supposed to be constant, each of these discs may a total disc thickness of approximately 1.2 mm (but is more preferably 1.40 mm or less if there is a label printed) and the substrate 500 may have a thickness of approximately 1.1 mm. That is why the distance from the light incident surface to the reference layer L0 will be approximately 0.1 mm. In the single-layer disc shown in FIG. 15 (i.e., if n=0 in FIG. 14), the cover layer 5011 has a thickness of approximately 0.1 mm. In the dual-layer disc shown in FIG. 16 (i.e., if n=1 in FIG. 14), the cover layer 5012 has a thickness of approximately 0.075 mm and the spacer layer 5302 has a thickness of approximately 0.25 mm. And in the three-layer disc shown in FIG. 17 (i.e., if n=2 in FIG. 14) and in the four-layer disc shown in FIG. 18 (i.e., if n=3 in FIG. 14), the cover layer 5014 and/or the spacer layer 5304 may be even thinner.

Also, in a recorder/player that uses an optical head including an objective lens with a high NA, aberrations such as a spherical aberration to be produced due to the thickness from the light incident surface of the disc to the information storage layer will seriously affect the quality of a laser beam to be converged on the information storage layer. For that reason, such an apparatus is provided with means for correcting such aberrations to be produced due to the thickness.

To eliminate the aberration components such as a spherical aberration to be produced due to the thickness from the surface of the protective coating of an optical information storage medium to the information storage layer from/on which information is read or written, the aberration correcting means generates an aberration that will cancel the aberration component that has been produced by each information storage layer. Such an aberration correcting means is originally designed optically so as to reduce the aberration with respect to the information storage layer of a single-layer structure and also takes into account the aberration to be produced when a read/write operation is performed on an information storage medium with a dual-layer structure. The minimum aberration point designed is defined to be located at a depth of approximately 80-90 μm as measured from the surface of the protective coating. That is why if a read/write radiation needs to be focused on an information storage layer, of which the depth is not equal to the minimum aberration point, then an appropriate aberration correction value should be set for that information storage layer by controlling the aberration correcting means.

BD's Physical Structure

Figure 19:
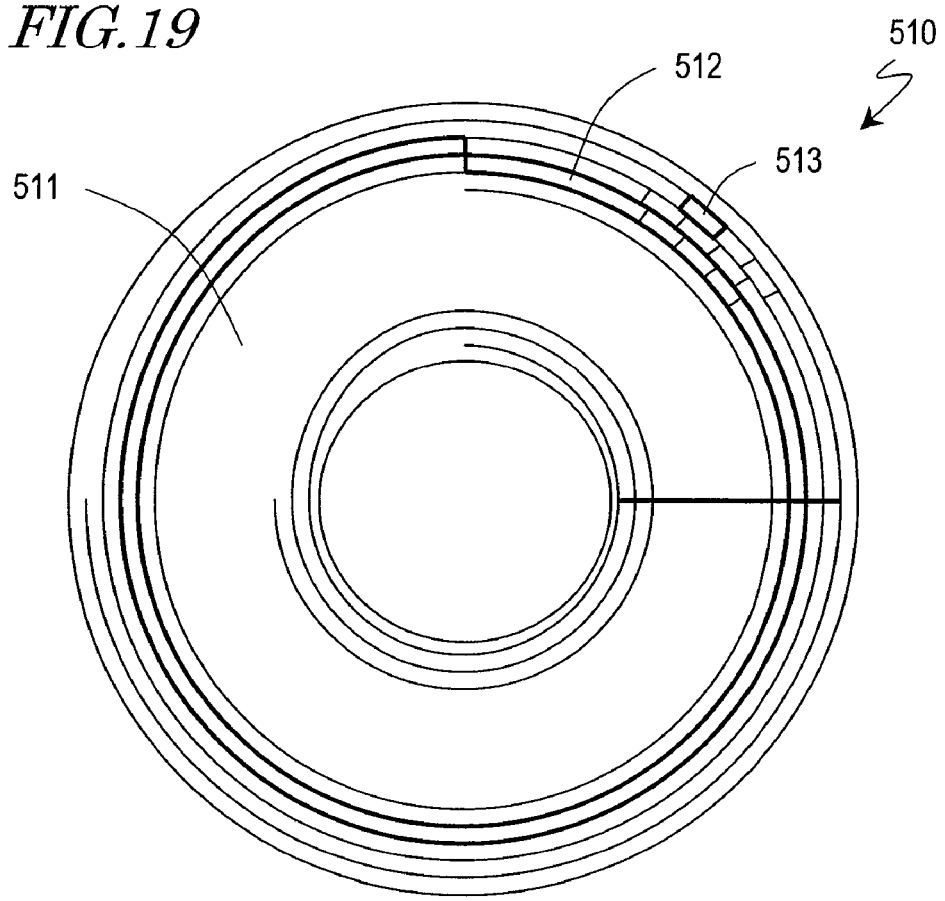
FIG. 19 is a schematic representation illustrating the physical structure of an information storage medium as a fourth preferred embodiment of the present invention.

FIG. 19 illustrates the physical structure of an optical disc 510 according to this preferred embodiment. On the disklike optical disc 510, a lot of tracks 512 are arranged either concentrically or spirally. And each of those tracks 512 is subdivided into a lot of sectors. As will be described later, data is supposed to be written on each of those tracks 512 on the basis of a block 513 of a predetermined size.

The optical disc 510 of this preferred embodiment has a greater storage capacity per information storage layer than a conventional optical disc (such as a 25 GB BD). The storage capacity is increased by increasing the storage linear density, e.g., by shortening the mark length of recording marks to be left on the optical disc, for example. As used herein, "to increase the storage linear density" means shortening the channel bit length, which is a length corresponding to one cycle time T of a reference clock signal (i.e., a reference cycle time T of modulation in a situation where marks are recorded by a predetermined modulation rule). The optical disc 510 may have multiple information storage layers. In the following description, however, only one information storage layer thereof will be described for convenience sake. In a situation where there are multiple information storage layers in the same optical disc, even if the tracks have the same width between the respective information storage layers, the storage linear densities could also be different from one layer to another by uniformly varying the mark lengths on a layer-by-layer basis.

Each track 512 is divided into a lot of blocks 513 every 64 kB (kilobytes), which is the data storage unit. And those blocks are given sequential block addresses. Each of those blocks 513 is subdivided into three subblocks, each having a predetermined length. The three subblocks are assigned subblock numbers of 0, 1 and 2 in this order.

Storage Density

Hereinafter, the storage density will be described with reference to FIGS. 20A, 20B, 21 and 22.

Figure 20A:
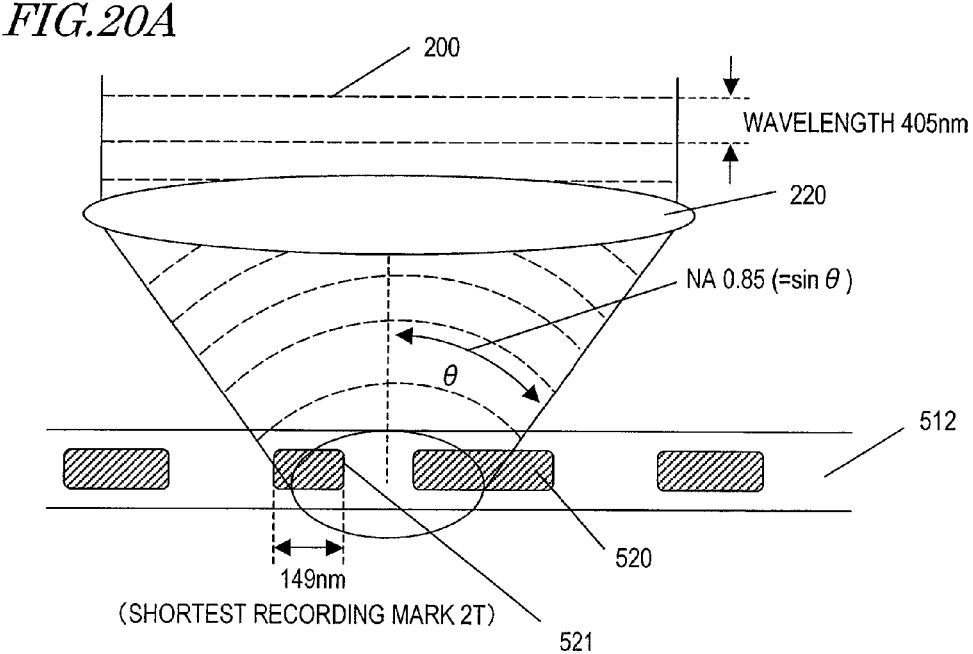
FIG. 20A is a schematic representation illustrating a laser beam spot and recording marks on a track.

FIG. 20A illustrates an example of a 25 GB BD, for which the laser beam 200 is supposed to have a wavelength of 405 nm and the objective lens 220 is supposed to have a numerical aperture (NA) of 0.85.

As in a DVD, data is also written on the track 512 of a BD as a series of marks 520, 521 that are produced as a result of a physical variation. The shortest one of this series of marks will be referred to herein as the "shortest mark". In FIG. 20A, the mark 521 is the shortest mark.

In a BD with a storage capacity of 25 GB, the shortest mark 521 has a physical length of 0.149 μm, which is approximately 1/2.7 of the shortest mark of a DVD. And even if the resolution of a laser beam is increased by changing the parameters of an optical system such as the wavelength (405 nm) and the NA (0.85), this value is still rather close to the limit of optical resolution, below which recording marks are no longer recognizable for the light beam.

Figure 21:
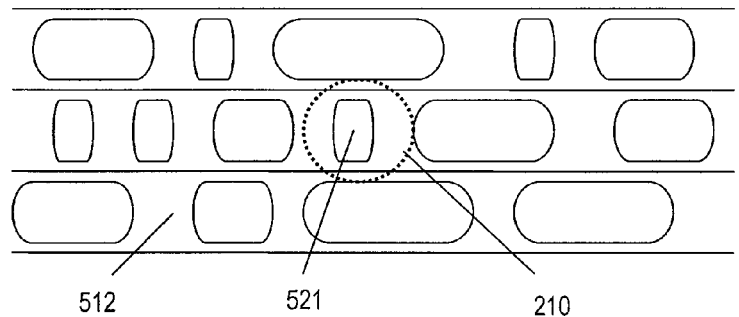
FIG. 21 is a schematic representation illustrating how a series of recording marks on a track is irradiated with a light beam.

FIG. 21 illustrates a state where a light beam spot has been formed on the series of recording marks on the track 512. In a BD, the light beam spot 210 has a diameter of about 0.39 μm, which may vary with parameters of the optical system. If the storage linear density is increased without changing the structures of the optical system, then the recording marks will shrink for the same spot size of the light beam spot 210 and the read resolution will decrease.

Figure 20B:
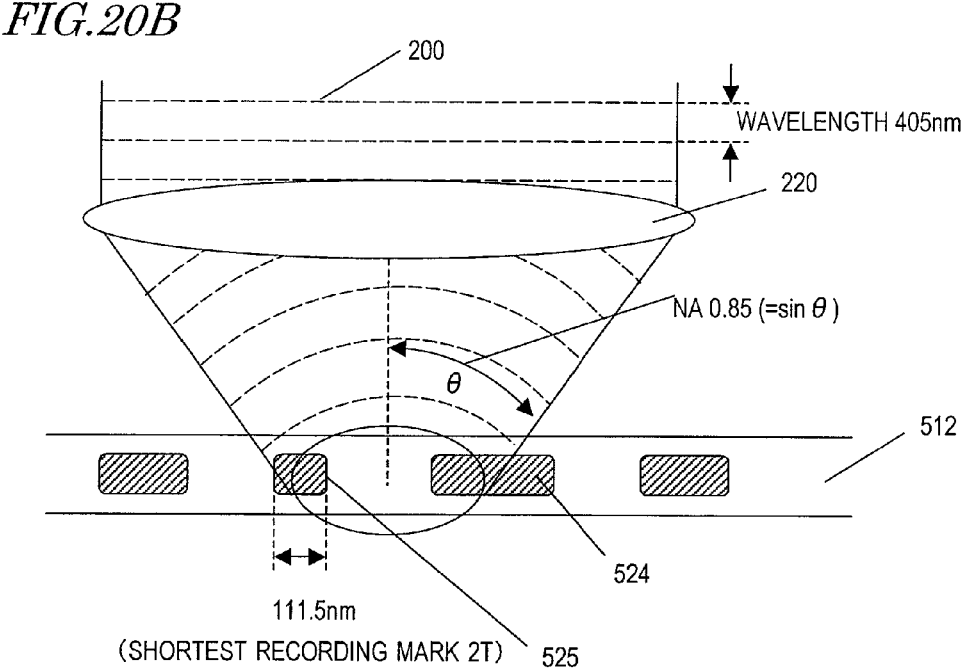
FIG. 20B is another schematic representation illustrating a laser beam spot and recording marks on a track.

On the other hand, FIG. 20B illustrates an example of an optical disc with an even higher storage density than a 25 GB BD. But even for such a disc, the laser beam 200 is also supposed to have a wavelength of 405 nm and the objective lens 220 is also supposed to have a numerical aperture (NA) of 0.85. Among the series of marks 524, 525 of such a disc, the shortest mark 525 has a physical length of 0.1115 μm. Compared to FIG. 20A, the spot size remains approximately 0.39 μm but both the recording marks and the interval between the marks have shrunk. As a result, the read resolution will decrease.

The shorter a recording mark, the smaller the amplitude of a read signal to be generated when the recording mark is scanned with a light beam. And the amplitude goes zero when the mark length gets equal to the limit of optical resolution. The inverse number of one period of these recording marks is called a "spatial frequency" and a relation between the spatial frequency and the signal amplitude is called an "optical transfer function (OTF)". As the spatial frequency rises, the signal amplitude decreases almost linearly. And the readable limit at which the amplitude of the signal goes zero is called an OTF cutoff.

Figure 22:
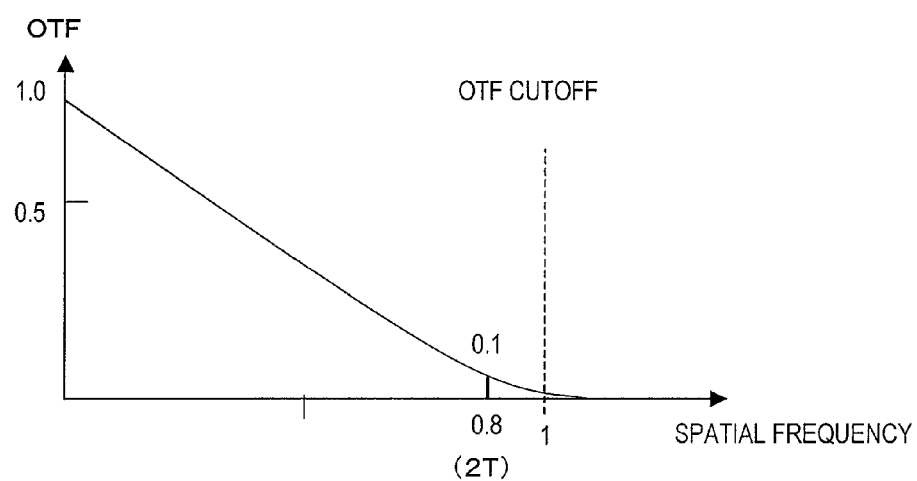
FIG. 22 is a graph showing how the OTF changes with the shortest recording mark.

FIG. 22 is a graph showing how the OTF of a BD with a storage capacity of 25 GB changes with the shortest recording mark length. The spatial frequency of the shortest mark on a BD is approximately 80% of, and is rather close to, the OTF cutoff frequency. It can also be seen that a read signal representing the shortest mark has amplitude that is as small as approximately 10% of the maximum detectable amplitude. The storage capacity at which the spatial frequency of the shortest mark on a BD is very close to the OTF cutoff frequency (i.e., the storage capacity at which the read signal has almost no amplitude) corresponds to approximately 31 GB in a BD. When the frequency of the read signal representing the shortest mark comes close to, or exceeds, the OTF cutoff frequency, the limit of optical resolution may have been reached or even surpassed for the laser beam. As a result, the read signal comes to have decreased amplitude and the SNR drops steeply.

That is why the high storage density optical disc shown in FIG. 20B would have its storage linear density defined by the frequency of the read signal representing the shortest mark, which may be in the vicinity of the OTF cutoff frequency (i.e., it is lower than, but not significantly lower than, the OTF cutoff frequency) or higher than the OTF cutoff frequency.

Figure 23:
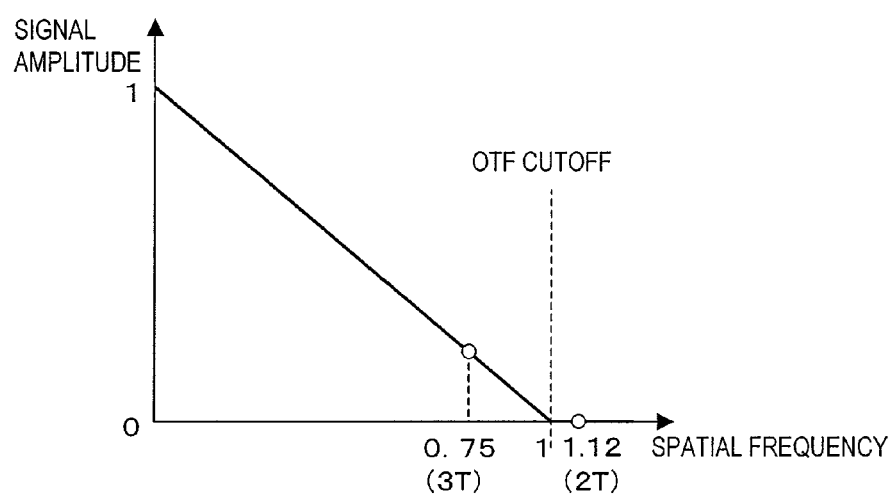
FIG. 23 is another graph showing how the OTF changes with the shortest recording mark.

FIG. 23 is a graph showing how the signal amplitude changes with the spatial frequency in a situation where the spatial frequency of the shortest mark (2T) is higher than the OTF cutoff frequency and where the 2T read signal has zero amplitude. In FIG. 23, the spatial frequency of the shortest mark 2T is 1.12 times as high as the OTF cutoff frequency.

Relation between Wavelength, NA and Mark Length

An optical disc with high storage density needs to satisfy the following relation between the wavelength, the numerical aperture, and the mark/space lengths.

Supposing the shortest mark length is TM nm and the shortest space length is TS nm, the sum P of the shortest mark length and the shortest space length is TM+TS nm. In the case of 17 modulation, P=2T+2T=4T. Using the three parameters of the wavelength λ of the laser beam (which is 405 nm±5 nm, i.e., in the range of 400 nm to 410 nm), the numerical aperture NA (which is 0.85±0.01, i.e., in the range of 0.84 to 0.86) and the sum P of the shortest mark length and the shortest space length (where P=2T+2T=4T in the case of 17 modulation, in which the shortest length is 2T), if the unit length T decreases to the point that the inequality $$P \leq \lambda/2NA$$

is satisfied, then the spatial frequency of the shortest mark exceeds the OTF cutoff frequency.

If NA=0.85 and λ=405, then the unit length T corresponding to the OTF cutoff frequency is calculated by $$T=405/(2\times0.85)/4=59.558 \text{ nm}.$$

Conversely, if P>λ/2NA is satisfied, then the spatial frequency of the shortest mark becomes lower than the OTF cutoff frequency.

As can be seen easily, just by increasing the storage linear density, the SNR would decrease due to the limit of optical resolution. That is why if the number of information storage layers per disc were increased excessively, then the decrease in SNR might be an impermissible degree, considering the system margin. Particularly around a point where the frequency of the shortest recording mark exceeds the OTF cutoff frequency, the SNR will start to decrease steeply.

In the foregoing description, the storage linear density has been described by comparing the frequency of the read signal representing the shortest mark to the OTF cutoff frequency. However, if the storage density of BDs is further increased, then the storage density (and the storage linear density and the storage capacity) can be defined based on the same principle as what has just been described by reference to the relation between the frequency of the read signal representing the second shortest mark (or the third shortest mark or an even shorter recording mark) and the OTF cutoff frequency.

Storage Density and Number of Layers>

A BD, of which the specifications include a wavelength of 405 m and a numerical aperture of 0.85, may have one of the following storage capacities per layer. Specifically, if the spatial frequency of the shortest marks is in the vicinity of the OTF cutoff frequency, the storage capacity could be approximately equal to or higher than 29 GB (such as 29.0 GB±0.5 GB or 29 GB±1 GB), approximately equal to or higher than 30 GB (such as 30.0 GB±0.5 GB or 30 GB±1 GB), approximately equal to or higher than 31 GB (such as 31.0 GB±0.5 GB or 31 GB±1 GB), or approximately equal to or higher than 32 GB (such as 32.0 GB±0.5 GB or 32 GB±1 GB).

On the other hand, if the spatial frequency of the shortest marks is equal to or higher than the OTF cutoff frequency, the storage capacity per layer could be approximately equal to or higher than 32 GB (such as 32.0 GB±0.5 GB or 32 GB±1 GB), approximately equal to or higher than 33 GB (such as 33.0 GB±0.5 GB or 33 GB±1 GB), approximately equal to or higher than 33.3 GB (such as 33.3 GB±0.5 GB or 33.3 GB±1 GB), approximately equal to or higher than 33.4 GB (such as 33.4 GB±0.5 GB or 33.4 GB±1 GB), approximately equal to or higher than 34 GB (such as 34.0 GB±0.5 GB or 34 GB±1 GB) or approximately equal to or higher than 35 GB (such as 35.0 GB±0.5 GB or 35 GB±1 GB)

In this case, if the storage density per layer is 33.3 GB, an overall storage capacity of approximately 100 GB (more exactly, 99.9 GB) is realized by the three storage layers combined. On the other hand, if the storage density per layer is 33.4 GB, an overall storage capacity that is more than 100 GB (more exactly, 100.2 GB) is realized by the three storage layers combined. Such a storage capacity is almost equal to the capacity in a situation where four storage layers, each having a storage density of 25 GB, are provided for a single BD. For example, if the storage density per layer is 33 GB, the overall storage capacity is 33×3=99 GB, which is just 1 GB (or less) smaller than 100 GB. On the other hand, if the storage density per layer is 34 GB, the overall storage capacity is 34×3=102 GB, which is 2 GB (or less) larger than 100 GB. Furthermore, if the storage density per layer is 33.3 GB, the overall storage capacity is 33.3×3=99.9 GB, which is only 0.1 GB (or less) smaller than 100 GB. And if the storage density per layer is 33.4 GB, the overall storage capacity is 33.4×3=100.2 GB, which is just 0.2 GB (or less) larger than 100 GB.

It should be noted that if the storage density were increased significantly, then it would be difficult to perform a read operation accurately because the shortest marks should be read under rather severe conditions. That is why a realistic storage density that would realize an overall storage capacity of 100 GB or more without increasing the storage density too much would be approximately 33.4 GB per layer.

In this case, the optical disc may have either a four-layer structure with a storage density of 25 GB per layer or a three-layer structure with a storage density of 33-34 GB per layer. If the number of information storage layers stacked in a disc is increased, however, the read signal obtained from each of those layers will have decreased amplitude (or a decreased SNR) and stray layer will also be produced from those layers (i.e., the read signal obtained from each information storage layer will be affected by a signal obtained from an adjacent layer). For that reason, if a three-layer disc with a storage density of 33-34 GB per layer is adopted instead of a four-layer disc with a storage density of 25 GB per layer, then an overall storage capacity of approximately 100 GB will be realized by the smaller number of layers (i.e., three instead of four) with the influence of such stray light minimized. That is why a disc manufacturer who'd like to realize an overall storage capacity of approximately 100 GB while minimizing the number of information storage layers stacked would prefer a three-layer disc with a storage density of 33-34 GB per layer. On the other hand, a disc manufacturer who'd like to realize an overall storage capacity of approximately 100 GB using the conventional format as it is (i.e., a storage density of 25 GB per layer) could choose a four-layer disc with a storage density of 25 GB per layer. In this manner, manufacturers with different needs could achieve their goals using mutually different structures, and, and therefore, are afforded an increased degree of flexibility in disc design.

Alternatively, if the storage density per layer is in the 30-32 GB range, the overall storage capacity of a three-layer disc will be short of 100 GB (i.e., approximately 90-96 GB) but that of a four-layer disc will be 120 GB or more. Among other things, if the storage density per layer is approximately 32 GB, a four-layer disc will have an overall storage capacity of approximately 128 GB, which is the seventh power of two that would be processed easily and conveniently by a computer. On top of that, compared to the overall storage capacity of approximately 100 GB realized by a three-layer disc, even shortest marks could also be read under less severe conditions.

That is why when the storage density needs to be increased, a number of different storage densities per layer (such as approximately 32 GB and approximately 33.4 GB) are preferably offered as multiple options so that a disc manufacturer can design a disc more flexibly by adopting one of those multiple storage densities and any number of storage layers in an arbitrary combination. For example, a manufacturer who'd like to increase the overall storage capacity while minimizing the influence of multiple layers stacked is offered an option of making a three-layer disc with an overall storage capacity of approximately 100 GB by stacking three storage layers with a storage density of 33-34 GB per layer. On the other hand, a manufacturer who'd like to increase the overall storage capacity while minimizing the impact on read performance is offered an option of making a four-layer disc with an overall storage capacity of approximately 120 GB or more by stacking four storage layers with a storage density of 30-32 GB per layer.

No matter which of these two structures is adopted for a BD, the best recording power can be determined for each information storage layer by using the optical disc structure of the first or second preferred embodiment of the present invention described above. That is why even if recording marks should be formed more accurately to cope with an increased storage linear density, a write operation can also be performed appropriately with the best recording power.

The present invention can be used effectively in various types of information storage media and information writing devices, and can be used particularly effectively in a write-once or rewritable information storage medium with three or more information storage layers and an information writing device compatible with such a storage medium.

What is claimed is:

1. An information storage medium with n information storage layers (where n is an integer that is equal to or greater than three), on which data can be written with a laser beam and which are stacked one upon the other, wherein each of the n information storage layers has a test write zone for determining the recording power of the laser beam, and wherein when those n information storage layers are counted from the one that is located most distant from the surface of the medium on which the laser beam is incident, there is a bigger radial location difference between the outer peripheral end of the inner one of the test write zones of $i^{th}$ and $(i+1)^{th}$ information storage layers (where i is an integer that satisfies $2 \leq i \leq n-1$) and the inner peripheral end of the other outer test write zone than between the outer peripheral end of the inner one of the test write zones of $j^{th}$ and $(j+1)^{th}$ information storage layers (where j is an integer that satisfies $1 \leq j \leq i-1$) and the inner peripheral end of the other outer test write zone.

2. An information reading device for performing a read operation on the information storage medium of claim 1, wherein the information storage medium has a control area in at least one of the n information storage layers thereof, and wherein the device performs at least one of the steps of:
   retrieving information about the information storage medium from the control area; and
   reading data that has been written on any of the n information storage layers with recording power that has been regulated with the test write zone of that layer.

3. A reading method for performing a read operation on the information storage medium of claim 1, wherein the information storage medium has a control area in at least one of the n information storage layers thereof, and wherein the method comprises at least one of the steps of:
   retrieving information about the information storage medium from the control area; and
   reading data that has been written on any of the n information storage layers with recording power that has been regulated with the test write zone of that layer.

* * * * *